United States Patent
Cao

(10) Patent No.: US 12,289,143 B2
(45) Date of Patent: Apr. 29, 2025

(54) ELECTRONIC DEVICE, WIRELESS COMMUNICATION METHOD, AND COMPUTER-READABLE STORAGE MEDIUM

(71) Applicant: Sony Group Corporation, Tokyo (JP)

(72) Inventor: Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 176 days.

(21) Appl. No.: 17/927,928

(22) PCT Filed: Feb. 10, 2021

(86) PCT No.: PCT/CN2021/076416
§ 371 (c)(1),
(2) Date: Feb. 7, 2023

(87) PCT Pub. No.: WO2021/164675
PCT Pub. Date: Aug. 26, 2021

(65) Prior Publication Data
US 2023/0208476 A1    Jun. 29, 2023

(30) Foreign Application Priority Data

Feb. 18, 2020  (CN) .......................... 202010100097.9

(51) Int. Cl.
*H04B 7/0408*  (2017.01)
*H04W 72/044*  (2023.01)

(52) U.S. Cl.
CPC ........ *H04B 7/0408* (2013.01); *H04W 72/046* (2013.01)

(58) Field of Classification Search
CPC .......................... H04B 7/0408; H04W 72/046
See application file for complete search history.

(56) References Cited

U.S. PATENT DOCUMENTS

2010/0067616 A1* 3/2010 Chun ................... H04B 7/0639
  375/295
2019/0297640 A1* 9/2019 Liou ....................... H04L 5/001
(Continued)

FOREIGN PATENT DOCUMENTS

| CN | 109792745 A | 5/2019 |
| CN | 109845371 A | 6/2019 |
| WO | 2019/219162 A1 | 11/2019 |

OTHER PUBLICATIONS

International Search Report and Written Opinion mailed on May 10, 2021, received for PCT Application PCT/CN2021/076416, filed on Feb. 10, 2021, 12 pages including English Translation.

(Continued)

*Primary Examiner* — David B Lugo
(74) *Attorney, Agent, or Firm* — XSENSUS LLP

(57) ABSTRACT

The present application relates to an electronic device, a wireless communication method, and a computer-readable storage medium. The electronic device comprises a processing circuit, and is configured to: configure, for a user equipment, multiple TCI states respectively corresponding to multiple transmitted beams, wherein the multiple transmitted beams are from at least two cells; and send indication information to the user equipment to indicate two or more TCI states of the multiple TCI states, or send activation information to the user equipment to activate the two or more TCI states of the multiple TCI states. By means of the electronic device, the wireless communication method and the computer-readable storage medium of the present application, the configuration, activation, and dynamic indication process of TCI states can be optimized.

20 Claims, 11 Drawing Sheets

(56) References Cited

U.S. PATENT DOCUMENTS

| | | | |
|---|---|---|---|
| 2019/0373450 A1 | 12/2019 | Zhou et al. | |
| 2021/0083813 A1* | 3/2021 | Wu | H04W 36/0072 |
| 2021/0159966 A1* | 5/2021 | Xi | H04B 7/0691 |
| 2021/0168030 A1* | 6/2021 | Li | H04W 72/23 |
| 2021/0226689 A1* | 7/2021 | Farag | H04W 24/10 |
| 2023/0353304 A1* | 11/2023 | Wu | H04L 5/0023 |

OTHER PUBLICATIONS

Ericsson, "MAC CE signaling impact of enhanced TCI indication framework", 3GPP TSG RAN WG2 Meeting #105bis, R2-1903572, Apr. 8-12, 2019, pp. 1-3.

* cited by examiner

ELECTRONIC DEVICE, WIRELESS COMMUNICATION METHOD, AND COMPUTER-READABLE STORAGE MEDIUM

CROSS-REFERENCE TO RELATED APPLICATIONS

This application is based on PCT filing PCT/CN2021/076416, filed Feb. 10, 2021, which claims priority to Chinese Patent Application No. 202010100097.9, entitled "ELECTRONIC DEVICE, WIRELESS COMMUNICATION METHOD, AND COMPUTER-READABLE STORAGE MEDIUM" filed on Feb. 18, 2020, all of which are incorporated herein by reference.

FIELD

Embodiments of the present disclosure generally relate to the field of wireless communication, and in particular to electronic equipment, a wireless communication method, and a computer-readable storage medium. More particularly, the present disclosure relates to electronic equipment serving as network side equipment in a wireless communication system, electronic equipment serving as user equipment in a wireless communication system, a wireless communication method performed by network side equipment in a wireless communication system, a wireless communication method performed by user equipment in a wireless communication system, and a computer-readable storage medium.

BACKGROUND

In a single frequency network (SFN), multiple remote radio heads (RRH) transmit a same content to user equipment (UE), in order to improve reliability of UE in downlink reception.

A Transmission Configuration Indicator (TCI) status corresponds to a Channel State Information Reference Signal (CSI-RS) or Synchronization Signal Block (SSB), and may be used to indicate a direction of a transmitting beam used by network side equipment to the UE. The network side equipment may configure multiple TCI states for the UE. Each of the TCI states corresponds to a reference signal (a CSI-RS or SSB), that is, corresponds to a direction of a transmitting beam. Optionally, the network side equipment may activate one or more of the configured TCI states of the UE. In addition, with respect to a PDSCH, the network side equipment may further dynamically indicate one of the configured or active TCI states, so that the UE can be aware of the direction of the transmitting beam to be used by the network side equipment.

In the SFN, directions of transmitting beams of the RRHs may be different, and therefore the UE needs to perform reception using multiple receiving beams corresponding to the transmitting beams. In a conventional process of configuring, activating, and dynamically indicating TCI states, only one TCI state can be activated or dynamically indicated at a time, that is, only a direction of one transmitting beam can be indicated to the UE at a time. That is, the UE cannot determine directions of the multiple transmitting beams through a single activation or dynamic indication, and cannot thereby determine directions of the multiple receiving beams.

In addition, in a case that the UE is in a high-speed movement, the UE may handover from one cell to an adjacent cell quickly. In the conventional process of configuring, activating, and dynamically indicating TCI states, only a TCI state corresponding to a transmitting beam from a serving cell for the UE can be configured, activated and dynamically indicated. That is, the UE needs to be re-configured with the TCI state when entering the adjacent cell. Therefore, the UE needs to be configured with the TCI state frequently.

Therefore, it is necessary to propose a technical solution to solve at least one of the above technical problems, so as to optimize the process of configuring, activating and dynamic indicating the TCI state.

SUMMARY

This section provides a general summary of the present disclosure, rather than a comprehensive disclosure of a full scope or all features of the present disclosure.

An objective of the present disclosure is to provide electronic equipment, a wireless communication method, and a computer-readable storage medium, in order to optimize a process of configuring, activating and dynamic indicating a TCI state.

According to an aspect of the present disclosure, electronic equipment is provided. The electronic equipment includes processing circuitry configured to: configure, for user equipment, multiple transmission configuration indication TCI states which correspond to a plurality of transmitting beams respectively, the multiple transmitting beams coming from at least two cells; and send indication information to the user equipment to indicate two or more TCI states of the multiple TCI states, or send activation information to the user equipment to activate two or more TCI states of the multiple TCI states.

According to another aspect of the present disclosure, electronic equipment is provided. The electronic equipment includes processing circuitry configured to: configure multiple transmission configuration indication TCI states which correspond to multiple transmitting beams respectively, the multiple transmitting beams coming from at least two cells; receive, from network side equipment, indication information or activation information to determine indicated or activated two or more TCI states of the multiple TCI states; and determine receiving beams according to transmitting beams corresponding to the two or more TCI states.

According to another aspect of the present disclosure, a wireless communication method performed by electronic equipment is provided. The method includes: configuring, for user equipment, multiple transmission configuration indication TCI states which correspond to multiple transmitting beams respectively, the multiple transmitting beams coming from at least two cells; and sending indication information to the user equipment to indicate two or more TCI states of the multiple TCI states, or sending activation information to the user equipment to activate two or more TCI states of the multiple TCI states.

According to another aspect of the present disclosure, a wireless communication method performed by electronic equipment is provided. The method includes: configuring multiple transmission configuration indication TCI states which correspond to multiple transmitting beams respectively, the multiple transmitting beams coming from at least two cells; receiving, from network side equipment, indication information or activation information to determine indicated or activated two or more TCI states of the multiple TCI states; and determining receiving beams according to transmitting beams corresponding to the two or more TCI states.

According to another aspect of the present disclosure, a computer-readable storage medium is provided. The computer-readable storage medium stores executable computer instructions. The executable computer instructions, when executed by a computer, causes the computer to perform the wireless communication method according to the present disclosure.

According to another aspect of the present disclosure, a computer program is provided. The computer program, when executed by a computer, causes the computer to perform the wireless communication method according to the present disclosure.

With the electronic equipment, the wireless communication method, and the computer-readable storage medium, the network equipment can configure, for the user equipment, multiple TCI states with respect to at least two cells, and send indication information or activation information to the user equipment to indicate or activate two or more TCI states of the multiple TCI states. In this way, the network side equipment can configure TCI states of multiple cells for the user equipment, so that the user equipment does not need to be configured with a TCI state frequently. Further, the indication information or activation information can indicate or activate multiple TCI states of the TCI states, so that the user equipment can determine multiple transmitting beams corresponding to the multiple TCI states, and thereby determine multiple receiving beams. In summary, with the electronic equipment, the wireless communication method and the computer-readable storage medium according to the present disclosure, a process of configuring, activating and dynamically indicating TCI states can be optimized.

Further areas of applicability will become apparent from the description provided herein. The description and specific examples in this summary are for purposes of illustration only and are not intended to limit the scope of the present disclosure.

BRIEF DESCRIPTION OF THE DRAWINGS

The drawings are described herein for illustrating selected embodiments, rather than all possible embodiments, and are not intended to limit the scope of the present disclosure. In the drawings.

Figure 1:
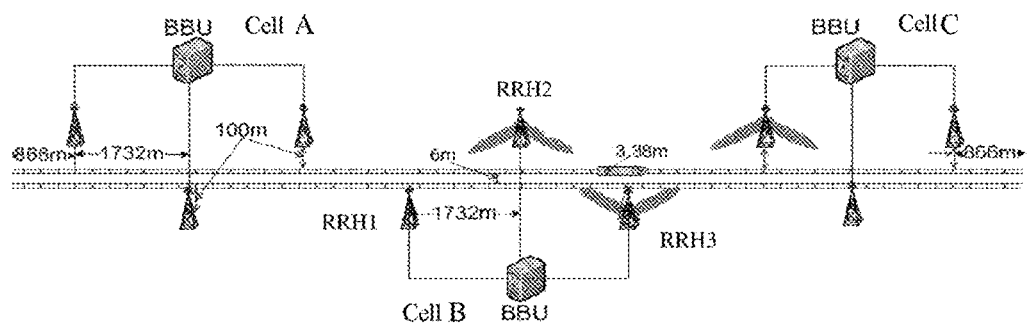
FIG. 1 is a schematic diagram showing a scenario in which user equipment is located in a vehicle traveling on a highway or railway.

Although the present disclosure is susceptible to various modifications and alternatives, specific embodiments of the present disclosure are shown in the drawings by way of examples and are described in detail herein. However, it should be understood that description of the specific embodiments herein is not intended to limit the present disclosure to the specific forms disclosed, but to cover all modifications, equivalents and substitutions that fall within the spirit and scope of the present disclosure. It should be noted that same or similar reference numerals throughout the drawings indicate the same or like components.

DETAILED DESCRIPTION

The embodiments of the present disclosure are described completely with reference to the drawings. The following description is merely exemplary, and is not intended to limit the present disclosure and application or use thereof.

Exemplary embodiments are provided so that the present disclosure is thorough and fully conveys the scope thereof to those skilled in the art. Numerous specific details, such as examples of specific components, devices, and methods, are set forth to provide a comprehensive understanding of the embodiments of the present disclosure. It is apparent for those skilled in the art that the exemplary embodiments may be implemented in many different forms without specific details, and should not be construed as limiting the scope of the present disclosure. In some exemplary embodiments, well-known processes, well-known structures, and well-known technologies are not described in detail.

The description is made in the following order:
1. Description of a scenario;
2. Configuration example of network side equipment;
3. Configuration example of user equipment;
4. Method embodiment;
5. Application examples.

1. Description of a Scenario

FIG. 1 is a schematic diagram showing a scenario in which user equipment is located in a vehicle traveling on a highway or railway. As shown in FIG. 1, there are three cells along a highway or railway, i.e., cell A, cell B, and cell C. Base station equipment of each of the cells may be implemented by one base band unit (BBU) connecting to multiple RRHs. The RRHs connected to a same BBU share a same cell ID, so that both the number of cell handovers and a handover delay due to each cell handover are reduced. As shown in FIG. 1, the BBU of each cell may be connected to three RRHs. In addition, each of the RRHs may have directions of one or more transmitting beams. For example, in FIG. 1, an RRH2 and an RRH3 of cell B and an RRH on the left side of Cell C may each have directions of two transmitting beams.

As mentioned above, in a conventional process of configuring, activating, and dynamically indicating TCI states, only one TCI state can be activated or dynamically indicated at a time, that is, only a direction of one transmitting beam can be indicated to the UE. In other words, the UE cannot determine directions of multiple transmitting beams through a single activation or dynamic indication, and cannot thereby determine directions of multiple receiving beams. In addition, in the scenario shown in FIG. 1, the UE is located on a highway or railway, and therefore is in a high-speed movement, traveling through cell A, cell B, and cell C quickly. In the conventional process of configuring, activating, and dynamically indicating TCI states, only a TCI state corresponding to a transmitting beam from a serving cell for the UE can be configured, activated and dynamically indicated. That is, when within a service range of cell A, the UE is configured, by cell A, with a TCI state of a directions of a transmitting beam corresponding to an RRH of cell A; when within a service range of cell B, the UE is configured, by cell B, with a TCI state of a direction of a transmitting beam corresponding to an RRH of cell B; and when within a service range of cell C, the UE is configured, by cell C, with a TCI state of a direction of a transmitting beam corresponding to an RRH of cell C. Therefore, the UE needs to be configured with TCI states frequently.

In view of the above scenario, the present disclosure proposes electronic equipment in a wireless communication system, a wireless communication method performed by electronic equipment in a wireless communication system, and a computer-readable storage medium, in order to optimize the conventional process of configuring, activating, and dynamically indicating TCI states.

It is to be noted that FIG. 1 shows merely a typical scenario for the present disclosure, and scenarios suitable for the present disclosure are not limited thereto. For example, in another scenario, base station equipment of each cell is implemented through multiple transmit receive pointes (TRPs). Each of the TRPs may have directions of one or more transmitting beams, and the TRPs send a same content to the user equipment. The present disclosure is applicable to all scenarios that need to optimize the process of configuring, activating and dynamically indicating TCI states.

According to the present disclosure, the wireless communication system may be a 5G NR (New Radio) communication system.

According to the present disclosure, the network side equipment may be any type of base station equipment, such as an eNB or gNB (base station in the 5th generation communication system).

According to the present disclosure, the user equipment may be a mobile terminal (such as a smartphone, a tablet personal computer (PC), a notebook PC, a portable game terminal, a portable/dongle mobile router, and a digital camera device), or an in-vehicle terminal (such as a car navigation device). The user equipment may be implemented as a terminal (also referred to as a machine type communication (MTC) terminal) that performs machine-to-machine (M2M) communication. In addition, the user equipment may be a wireless communication module (such as an integrated circuit module including a single chip) installed on each of the above terminals.

2. Configuration Example of Network Side Equipment

Figure 2:
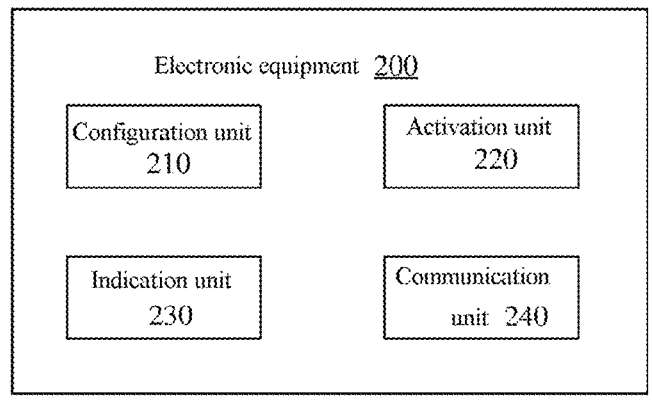
FIG. 2 is a block diagram showing an example of a configuration of electronic equipment serving as network side equipment according to an embodiment of the present disclosure.

FIG. 2 is a block diagram showing an example of a configuration of electronic equipment 200 according to an embodiment of the present disclosure. The electronic equipment 200 may serve as network side equipment in a wireless communication system, specifically as base station equipment in the wireless communication system.

As shown in FIG. 2, the electronic equipment 200 may include a configuration unit 210, an activation unit 220, an indication unit 230, and a communication unit 240.

Here, units of the electronic equipment 200 may be included in processing circuitry. It should be noted that the electronic equipment 200 may include a single processing circuit, or multiple processing circuits. Further, the processing circuitry may include various discrete functional units to perform various different functions and/or operations. It should be noted that these functional units may be physical entities or logical entities, and units with different names may be implemented by a same physical entity.

According to an embodiment of the present disclosure, the configuration unit 210 may configure, for user equipment, multiple TCI states which correspond to multiple transmitting beams respectively. Here, the multiple transmitting beams come from at least two cells.

According to an embodiment of the present disclosure, the activation unit 220 may determine which TCI states among the multiple TCI states configured by the configuration unit 210 need to be activated, and may generate and send activation information to notify the user equipment of activated two or more TCI states.

According to an embodiment of the present disclosure, the electronic equipment 200 may send activation information to the user equipment through the communication unit 240, to notify the user equipment of the activated two or more TCI states of the multiple TCI states.

According to an embodiment of the present disclosure, the indication unit 230 may determine which TCI states among the multiple TCI states configured by the configuration unit 210 need to be indicated, and may generate indication information to notify the user equipment of indicated two or more TCI states.

According to an embodiment of the present disclosure, the electronic equipment 200 may send indication information to the user equipment through the communication unit

240, to notify the user equipment of the indicated two or more TCI states of the multiple TCI states.

As described above, the electronic equipment 200 according to the present disclosure can configure, for the user equipment, multiple TCI states with respect to at least two cells, and can send indication information or activation information to the user equipment to indicate or activate two or more TCI states of the multiple TCI states. In this way, the electronic equipment 200 can configure TCI states of multiple cells for the user equipment, so that the user equipment does not need to be configured with TCI states frequently. Further, the indication information or activation information can indicate or activate multiple TCI states of the TCI states, so that the user equipment can determine multiple transmitting beams corresponding to the multiple TCI states, and thereby determine multiple receiving beams. Since the multiple transmitting beams transmit a same content, an accuracy of data reception by the user equipment can be improved. In summary, according to the embodiment of the disclosure, a process of configuring, activating, and dynamically indicating TCI states can be optimized.

According to an embodiment of the present disclosure, there is a correspondence between TCI states and reference signals (CSI-RSs or SSBs), and there is a correspondence between the reference signals and transmitting beams. Therefore, the TCI states may be used to indicate directions of the transmitting beams. With respect to a PDSCH and a PDCCH, processes of configuring, activating, and dynamically indicating the TCI states are slightly different from each other, and therefore are described separately hereinafter.

With respect to a PDSCH (a downlink data signal), the configuration unit 210 may configure multiple TCI states for the user equipment, and the indication unit 230 may send indication information to the user equipment to dynamically indicate multiple TCI states among the multiple TCI states configured by the configuration unit 210. Alternatively, the configuration unit 210 may configure multiple TCI states for the user equipment, the activation unit 220 may send activation information to the user equipment to indicate which TCI states among the multiple TCI states configured by the configuration unit 210 are activated, and the indication unit 230 may send indication information to the user equipment to dynamically indicate the multiple TCI states among the multiple TCI states activated by the activation unit 220. Here, the TCI states dynamically indicated by the indication unit 230 are used to indicate transmitting beams of the PDSCH. The dynamically indicated TCI states correspond to the transmitting beams used for the PDSCH. That is, the electronic equipment 200 expects to use the transmitting beams corresponding to the dynamically indicated TCI states to transmit the PDSCH. According to an embodiment of the present disclosure, the electronic equipment 200 may carry configuration information for the PDSCH by radio resource control (RRC) signaling, carry the activation information for the PDSCH by media access control (MAC) control element (CE), and carry the instruction information for the PDSCH by downlink control information (DCI).

With respect to a PDCCH (a downlink control signal), the configuration unit 210 may configure multiple TCI states for the user equipment, and the activation unit 220 may send activation information to the user equipment to indicate which TCI states among the multiple TCI states configured by the configuration unit 210 are activated. Here, the TCI states activated by the activation unit 220 is used to indicate transmitting beams for transmitting the PDCCH. The activated TCI states correspond to the transmitting beams used for the PDCCH. That is, the electronic equipment 200 expects to use the transmitting beams corresponding to the activated TCI states to transmit the PDCCH. According to an embodiment of the present disclosure, the electronic equipment 200 may carry configuration information for the PDCCH by RRC signaling, and carry the activation information for the PDCCH by MAC CE.

First Embodiment

PDSCH
Configuration of TCI States

The configuration unit 210 may configure, for the user equipment, multiple TCI states which correspond to multiple transmitting beams respectively. Here, the multiple transmitting beams come from at least two cells.

According to an embodiment of the present disclosure, the multiple transmitting beams may come from a serving cell of the user equipment and a non-serving cell of the user equipment. For example, the multiple transmitting beams may come from at least two cells on a travel route of the user equipment. Here, the electronic equipment 200 may predict the travel route of the user equipment in advance, and determine multiple cells that the electronic equipment will pass along the travel route. Hence, the configuration unit 210 may configure, for the user equipment, TCI states corresponding to transmitting beams from the multiple cells. For the scenario of the highway or railway, the travel route of the user equipment is fixed. The electronic equipment 200 may directly determine multiple cells on the travel route based on deployment of the highway or railway. Therefore, the configuration unit 210 may configure, for the user equipment, the TCI states which correspond to the transmitting beams coming from these cells respectively.

According to an embodiment of the present disclosure, the configuration unit 210 may set locations of TCI states according to locations of the cells. For example, in a case that the user equipment will travel through cell A, cell B, and cell C in the above-listed sequence, configured TCI states are in an order of: TCI states corresponding to transmitting beams of cell A, TCI states corresponding to transmitting beams of cell B, and TCI states corresponding to transmitting beams of cell C. Furthermore, within each cell, the configuration unit 210 may set the locations of the TCI states according to an order of the RRHs. For example, in a case that the user equipment will travel through RRH1, RRH2 and RRH3 in the above-listed sequence, the configured TCI states may be in an order of: TCI states corresponding to transmitting beams of RRH1, TCI states corresponding to transmitting beams of RRH2, and TCI states corresponding to transmitting beams corresponding to RRH3.

According to an embodiment of the present disclosure, the electronic equipment 200 may determine, according to the number of TCI states that the configuration unit 210 can configure, TCI states corresponding to transmitting beams from how many cells to be configured for the user equipment. In a preferred embodiment, the configuration unit 210 may configure up to 128 TCI states. Apparently, with development of technology and update of standards, the number of TCI states configured by the configuration unit 210 may be changed.

According to an embodiment of the present disclosure, each TCI state configured by the configuration unit 210 may include: a reference signal corresponding to the TCI state and identification information of a cell to which the transmitting beam corresponding to the TCI state belongs. A pseudo code of information of the TCI state according to an embodiment of the present disclosure is shown below. In the pseudo code, TCI-StateId represents an ID of the TCI state, ServCellIndex represents an identification of a serving cell of the user equipment, PCI represents an identification of a cell to which the transmitting beam corresponding to the TCI state belongs, NZP-CSI-RS-ResourceId represents an ID of a CSI-RS resource corresponding to the TCI state, and SSB-Index represents an ID of an SSB corresponding to the TCI state.

```
TCI-State ::=           SEQUENCE {
    tci-StateId             TCI-StateId,
    qcl-Type1               QCL-Info,
    qcl-Type2       QCL-Info             OPTIONAL, --
Need R
    ...
}
QCL-Info ::=            SEQUENCE {
    cell                    CHOICE {
                                ServCellIndex
                                PCI
                            }
    bwp-Id          BWP-Id               OPTIONAL, --
Cond CSI-RS-Indicated
    referenceSignal         CHOICE {
        csi-rs                  NZP-CSI-RS-ResourceId,
        ssb                     SSB-Index
    }
    qcl-Type                ENUMERATED {typeA, typeB, typeC,
typeD},
```

Figure 3:
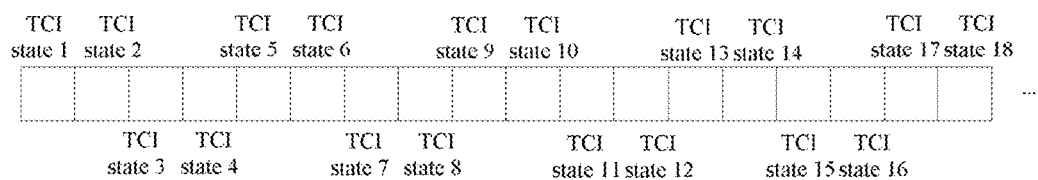
FIG. 3 is a schematic diagram showing configuration of TCI states according to an embodiment of the present disclosure.

FIG. 3 is a schematic diagram showing configuration of TCI states for a scenario as shown in FIG. 1 according to an embodiment of the present disclosure. FIG. 1 shows three cells along a travel route of user equipment, i.e., cell A, cell B, and cell C. Each of the cells includes three RRHs. It is assumed that each RRH has two transmitting beams, that is, each cell has six transmitting beams. As shown in FIG. 3, the configuration unit 210 may configure 18 TCI states, referred to as TCI state 1 to TCI state 18, for the user equipment. Each of the TCI states corresponds to a transmitting beam. That is, TCI state 1 to TCI state 6 correspond to six transmitting beams in cell A, TCI state 7 to TCI state 12 correspond to six transmitting beams in cell B, and TCI state 13 to TCI state 18 correspond to six transmitting beams in cell C. In an example as shown in FIG. 3, the 18 TCI states may be configured for the user equipment by current serving base station equipment of the user equipment before the user equipment travels through cell A, so that it is not necessary to configure TCI states for the user equipment when the user equipment travels through cell A and cell B. When the user equipment travels through Cell C, TCI states corresponding to transmitting beams of the following cells may be configured for the user equipment by base station equipment of cell C. Therefore, according to the embodiment of the present disclosure, the number of times the user equipment is configured with TCI states can be reduced.

Activation of TCI States

According to an embodiment of the present disclosure, the activation unit 220 may determine which TCI states of the multiple TCI states configured by the configuration unit 210 are activated for the user equipment. This is because the number of TCI states configured by the configuration unit is great, which results in a high overhead of the indication unit 230 when dynamically indicating TCI states in a subsequent process. Therefore, the activation unit 220 may activate some of the TCI states in advance, so as to reduce the overhead in the subsequent process.

According to an embodiment of the present disclosure, when the user equipment is on a highway or railway, TCI states corresponding to transmitting beams of a cell that the user equipment is about to travel through may be activated for the user equipment. In a preferred embodiment, the activation unit 220 can activate up to 8 TCI states at a time. Apparently, with the development of technology and the update of standards, a maximum number of TCI states activated by the activation unit 220 can be changed.

Figure 4:
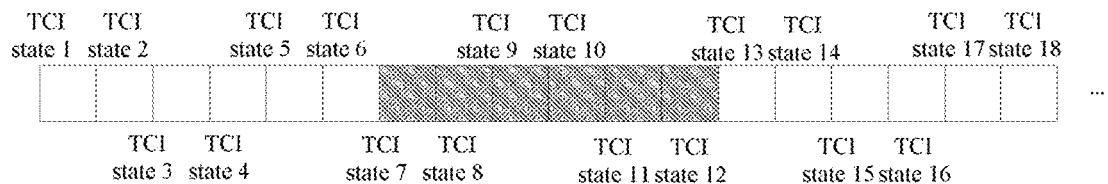
FIG. 4 is a schematic diagram showing activation of TCI states with respect to a PDSCH according to the embodiment of the present disclosure.

FIG. 4 is a schematic diagram showing activation of TCI states with respect to a PDSCH according to an embodiment of the present disclosure. As shown in FIG. 4, when the user equipment is about to travel through cell B, TCI state 7 to TCI state 12 may be activated by a current serving base station equipment of the user equipment. The activated TCI states are shown as grey areas.

Dynamic Indication of TCI States

According to an embodiment of the present disclosure, the indication unit 230 may determine TCI states which need to be dynamically indicated, that is, TCI states corresponding to transmitting beams to be used for transmitting a PDSCH. Here, the dynamically indicated TCI states may be multiple TCI states of the TCI states configured by the configuration unit 210, or may be multiple TCI states of the TCI states activated by the activation unit 220. Further, the indication unit 230 may generate indication information to notify the user equipment of indicated two or more TCI states.

According to an embodiment of the present disclosure, the indication information includes information for identifying a particular TCI state of the multiple TCI states configured by the configuration unit 210 or a particular TCI state of the multiple TCI states activated by the activation unit 220. Each particular TCI state has TCI states associated with the particular TCI state. Hence, the user equipment can determine the particular TCI state and the TCI states associated with the particular TCI state according to the indication information.

According to an embodiment of the present disclosure, the TCI states associated with the particular TCI state may include a predetermined number of TCI states from the particular TCI state. That is, the TCI states associated with the particular TCI state may include a predetermined number of TCI states previous to the particular TCI state and a predetermined number of TCI states following the particular TCI state. For example, in a case that the particular TCI state is TCI state 4 and the predetermined number is 2, the TCI states associated with the particular TCI state are TCI state 2, TCI state 3, TCI state 5, and TCI state 6.

According to an embodiment of the present disclosure, the predetermined number may be 1. That is, the TCI states associated with the particular TCI state include TCI states adjacent to the particular TCI state, that is, a TCI state immediately previous to the particular TCI state and a TCI state immediately following the particular TCI state. For example, in a case that the particular TCI state is TCI state 4 and the predetermined number is 1, then the TCI states associated with the particular TCI state are TCI state 3 and TCI state 5.

According to an embodiment of the present disclosure, the indication unit 230 may indicate the particular TCI state to the user equipment by including identification information of the particular TCI state in the indication information.

Figure 5:
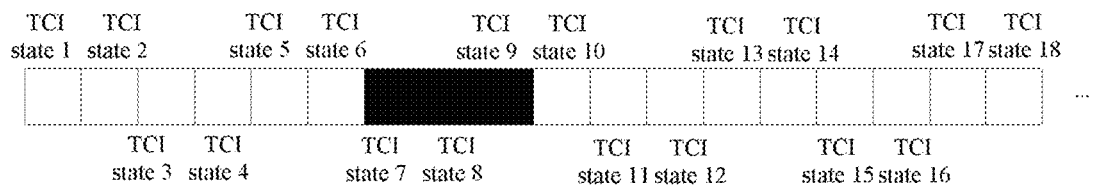
FIG. 5 is a schematic diagram showing dynamic indication of TCI states with respect to a PDSCH according to an embodiment of the present disclosure.

FIG. 5 is a schematic diagram showing dynamic indication of TCI states with respect to a PDSCH according to an embodiment of the present disclosure. As shown in FIG. 5, TCI state 8 is a particular TCI state, and identification information of TCI state 8 may be included in indication information. User equipment may determine, according to TCI state 8 included in the indication information, that TCI states dynamically indicated by the electronic equipment 200 includes TCI state 7, TCI state 8, and TCI state 9.

Figure 6:
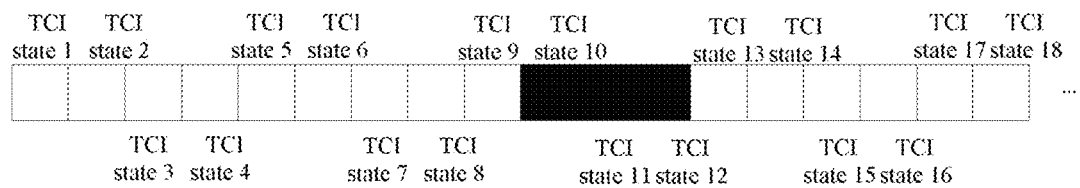
FIG. 6 is a schematic diagram showing dynamic indication of TCI states with respect to a PDSCH according to an embodiment of the present disclosure.

FIG. 6 is a schematic diagram showing dynamic indication of TCI states with respect to a PDSCH according to an embodiment of the present disclosure. As shown in FIG. 6, TCI state 11 is a particular TCI state, and identification information of TCI state 11 may be included in indication information. User equipment may determine, according to TCI state 11 included in the indication information, that TCI states dynamically indicated by the electronic equipment 200 includes TCI state 10, TCI state 11, and TCI state 12.

According to an embodiment of the present disclosure, the indication unit 230 may indicate the particular TCI state to the user equipment by including, in the indication information, a differential value between identification information of the particular TCI state which is included in the indication information this time and identification information of the particular TCI state which is included in the indication information last time. That is, the indication information may include an offset value of the particular TCI state relative to last time.

According to an embodiment of the present disclosure, in a case that the indication information includes the differential value, or offset value, all subsequent indications may include merely the differential value or offset value of the particular TCI state, except that the identification information of the particular TCI state needs to be included when indicating the particular TCI state for the first time. Thereby, an overhead of the indication information can be significantly reduced. In this way, operations of the activation unit 220 can be omitted. That is, the indication unit 230 may dynamically indicate multiple TCI states of the multiple TCI states configured by the configuration unit 210 by using the differential value or offset value.

According to an embodiment of the present disclosure, the differential value or offset value may be positive. Alternatively, the differential value or offset value may be negative. Furthermore, since there is a limit on a maximum number of the TCI states configured by the configuration unit 210 each time, a count may start again from 0 in response to the user equipment determining, according to the differential value or offset value, that an identification of a particular TCI state this time overflows the maximum number of TCI states configured by the configuration unit 210. That is, a cyclic shift is performed.

Figure 7:
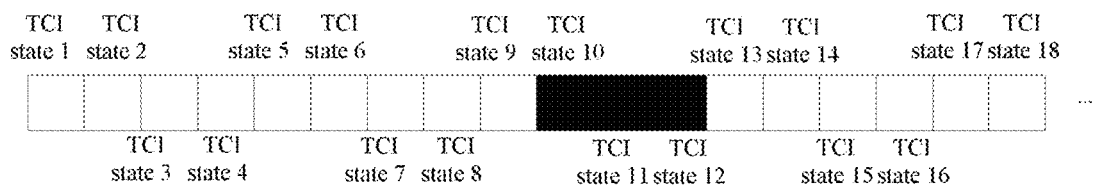
FIG. 7 is a schematic diagram showing dynamic indication of TCI states with respect to a PDSCH according to an embodiment of the present disclosure.

FIG. 7 is a schematic diagram showing dynamic indication of TCI states with respect to a PDSCH according to an embodiment of the present disclosure. In an example as shown in FIG. 7, it is assumed that a particular TCI state included in indication information last time is TCI state 8, and the particular TCI state included in indication information this time is TCI state 11. Hence, the indication information this time may include a differential value of 3 (011). Based on the differential value of 3, user equipment may determine that the particular TCI state has shifted 3 TCI states from TCI state 8, and thus determine that the particular TCI state is TCI state 11. Then, according to TCI state 11, the user equipment can determine that TCI states dynamically indicated by the electronic equipment 200 include TCI state 10, TCI state 11, and TCI state 12.

As described above, according to the embodiments of the present disclosure, with respect to a PDSCH, TCI states corresponding to transmitting beams from multiple cells may be configured, so that user equipment does not need to be configured with TCI states frequently. Further, indication information may be sent to the user equipment to indicate two or more TCI states of the multiple TCI states, so that the user equipment can determine multiple transmitting beams corresponding to multiple TCI states, and thus determine multiple receiving beams for receiving the PDSCH. Since the multiple transmitting beams transmit a same content, an accuracy of signal reception by the user equipment can be improved.

PDCCH

Configuration of TCI States

According to an embodiment of the present disclosure, configuration of TCI states with respect to a PDCCH is the same as that with respect to the PDSCH, and is not described in detail here.

Activation of TCI Status

According to an embodiment of the present disclosure, the activation unit 220 may determine TCI states to be activated, that is, TCI states corresponding to transmitting beams to be used for transmitting a PDCCH. Here, the activated TCI states may be multiple TCI states of TCI states configured by the configuration unit 210. Further, the activation unit 220 may generate activation information to notify user equipment of activated two or more TCI states.

According to an embodiment of the present disclosure, the activation unit 220 may activate multiple TCI states for each control resource set (CORESET). Here, the CORESET represents resources occupied by the PDCCH to be transmitted, including time domain resources and frequency domain resources.

According to an embodiment of the present disclosure, the activation information includes information for identifying a particular TCI state of the multiple TCI states configured by the configuration unit 210. Each particular TCI state has TCI states associated with the particular TCI state. Hence, the user equipment can determine the particular TCI state and the TCI states associated with the particular TCI state according to the activation information.

According to an embodiment of the present disclosure, the TCI states associated with the particular TCI state may include a predetermined number of TCI states from the particular TCI state. That is, the TCI states associated with the particular TCI state may include a predetermined number of TCI states previous to the particular TCI state and a predetermined number of TCI states following the particular TCI state. For example, in a case that the particular TCI state is TCI state 4 and the predetermined number is 2, the TCI states associated with the particular TCI state are TCI state 2, TCI state 3, TCI state 5, and TCI state 6.

According to an embodiment of the present disclosure, the predetermined number may be 1. That is, the TCI states associated with the particular TCI state include TCI states adjacent to the particular TCI state, that is, a TCI state immediately previous to the particular TCI state and a TCI state immediately following the particular TCI state. For example, in a case that the particular TCI state is TCI state 4 and the predetermined number is 1, then the TCI states associated with the particular TCI state are TCI state 3 and TCI state 5.

According to an embodiment of the present disclosure, the activation unit 220 may indicate the particular TCI state to the user equipment by including identification information of the particular TCI state in the activation information.

Figure 8:
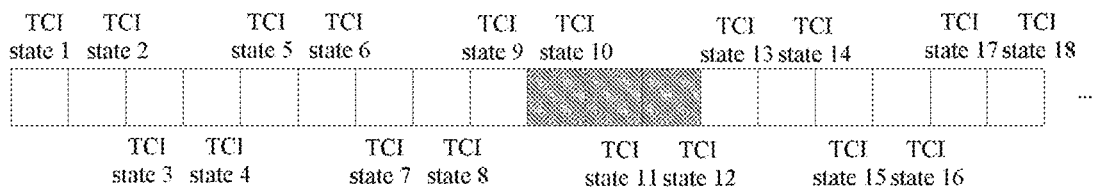
FIG. 8 is a schematic diagram showing activation of TCI states with respect to a PDCCH according to an embodiment of the present disclosure.

FIG. 8 is a schematic diagram showing activation of TCI states with respect to a PDCCH according to an embodiment of the present disclosure. As shown in FIG. 8, TCI state 11 is a particular TCI state, and identification information of TCI state 11 may be included in activation information. User equipment may determine, according to TCI state 11 included in the activation information, TCI states activated by the electronic equipment 200 include TCI state 10, TCI state 11, and TCI state 12.

According to an embodiment of the present disclosure, the activation unit 220 may indicate the particular TCI state to the user equipment by including, in the activation information, a differential value between identification information of the particular TCI state which is included in the activation information this time and identification information of the particular TCI state which is included in the activation information last time. That is, the activation information may include an offset value of the particular TCI state relative to last time.

According to an embodiment of the present disclosure, in a case that the activation information includes the differential value, or offset value, all subsequent activation information may include merely the differential value or offset value of the particular TCI state, except that the identification information of the particular TCI state needs to be included when indicating the particular TCI state for the first time. Thereby, an overhead of the indication information can be significantly reduced.

According to an embodiment of the present disclosure, the differential value or offset value may be positive. Alternatively, the differential value or offset value may be negative. Furthermore, since there is a limit on a maximum number of the TCI states configured by the configuration unit 210 each time, a count may start again from 0 in response to the user equipment determining, according to the differential value or offset value, that an identification of a particular TCI state this time overflows the maximum number of TCI states configured by the configuration unit 210. That is, a cyclic shift is performed.

Figure 9:
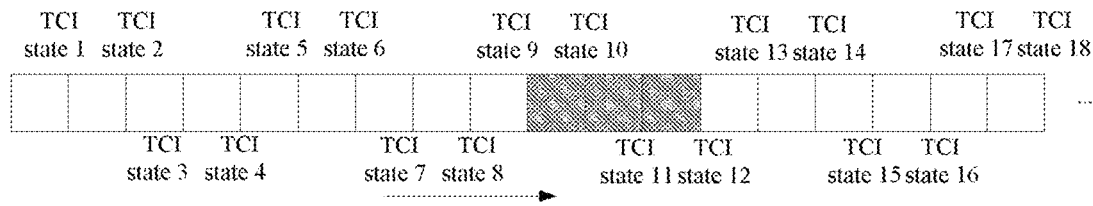
FIG. 9 is a schematic diagram showing activation of TCI states with respect to a PDCCH according to an embodiment of the present disclosure.

FIG. 9 is a schematic diagram showing activation of TCI states with respect to a PDCCH according to an embodiment of the present disclosure. In an example as shown in FIG. 9, it is assumed that a particular TCI state included in activation information last time is TCI state 8, and the particular TCI state included in activation information this time is TCI state 11. Hence, the activation information this time may include a differential value of 3 (011). Based on the differential value of 3, user equipment may determine that the particular TCI state has shifted 3 TCI states from TCI state 8, and thus determine that the particular TCI state is TCI state 11. Then, according to TCI state 11, the user equipment can determine that TCI states activated by the electronic equipment 200 include TCI state 10, TCI state 11, and TCI state 12.

As described above, according to the embodiments of the present disclosure, with respect to a PDCCH, TCI states corresponding to transmitting beams from multiple cells can be configured, so that user equipment does not need to be configured with TCI states frequently. Further, activation information may be sent to the user equipment to activate two or more TCI states of the multiple TCI states, so that the user equipment can determine multiple transmitting beams corresponding to multiple TCI states, and thus determine multiple receiving beams for receiving the PDCCH. Since the multiple transmitting beams transmit a same content, an accuracy of signal reception by the user equipment can be improved.

Second Embodiment

PDSCH
Configuration of TCI States

Configuration of TCI states according to the second embodiment of the present disclosure is the same as the configuration of TCI states according to the first embodiment of the present disclosure, and is not repeated here.

Activation of TCI States

According to the embodiment of the present disclosure, the electronic equipment 200 may divide multiple TCI states configured by the configuration unit 210 into multiple groups, where each group includes one or more TCI states, preferably multiple TCI states. The number of TCI states included in the groups may be the same or different. For example, electronic equipment 200 may group TCI states based on locations of cells and transmitting beam corresponding to the TCI states. For example, the electronic equipment 200 may divide TCI states corresponding to transmitting beams whose locations are close to each other into a same group. In a special example, the electronic equipment 200 may divide TCI states corresponding to transmitting beams belonging to a same cell into a same group. Apparently, a principle of grouping is not limited herein.

Further, according to an embodiment of the present disclosure, the activation unit 220 may determine which groups of the multiple groups of TCI states configured by the configuration unit 210 are to be activated. Further, the activation unit 220 may generate activation information and send the activation information to the user equipment through the communication unit 240 to activate the multiple groups of TCI states. Each group of TCI states includes one or more TCI states, preferably multiple TCI states.

According to an embodiment of the present disclosure, the activation information generated by the activation unit 220 may include group identification information (also referred to as a TCI codepoint index) of each activated group of TCI states and identification information of each TCI state included in each group of TCI states.

According to an embodiment of the present disclosure, the activation information may further include identification information of a cell targeted by a group of TCI states, that is, the group of TCI states is set for the cell, although TCI states in the group may come from different cells.

Figure 10:
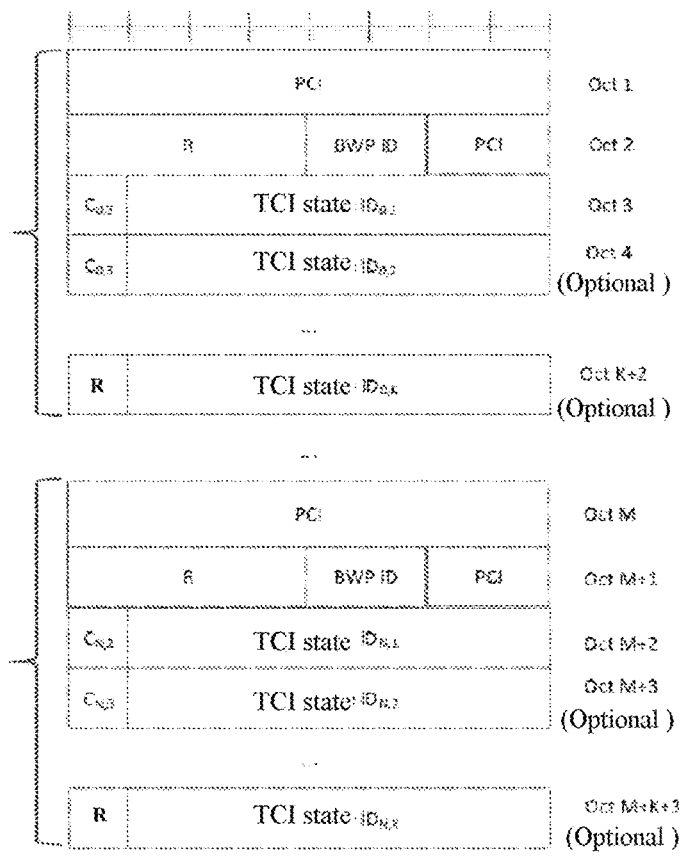
FIG. 10 is a schematic diagram showing activation of TCI states with respect to a PDSCH according to another embodiment of the present disclosure.

FIG. 10 is a schematic diagram showing activation of TCI state with respect to a PDSCH according to another embodiment of the present disclosure. In FIG. 10, PCI represents a physical cell identification of a cell to which a group of TCI states is targeted. That is, the group of TCI states is set for the cell having this PCI identification. TCI states in this group may come from different cells. R represents a reserved space. BWP ID represents an identification of a band width part (BWP) used by the cell having the PCI identification. TCI state ID, represents an identification of the j-th TCI state in a group numbered i. $C_{i,j}$ represents whether there is a j-th TCI state in a group numbered i. A value 0 of $C_{i,j}$ indicates that there is no j-th TCI state in a group numbered i; and a value 1 of $C_{i,j}$ indicates that there is a j-th TCI state in a group numbered i. i represents group identification information ranging from 0 to N, that is, there are N+1 groups of TCI states. j represents a serial number of a TCI state in a group, ranging from 1 to K, that is, each group includes up to K TCI states. Preferably, K may be 2 or 4.

As shown in FIG. 10, in a group numbered 0, TCI state $ID_{0,1}$ represents an identification of a $1^{st}$ TCI state in a group numbered 0. $C_{0,2}$ indicates whether there is a $2^{nd}$ TCI state in the group numbered 0, that is, whether there is a field of TCI state $ID_{0,2}$. In a case that $C_{0,2}$ is 1, TCI state $ID_{0,2}$ represents an identification of the $2^{nd}$ TCI state in the group numbered 0. $C_{0,3}$ indicates whether there is a $3^{rd}$ TCI state in the group numbered 0, that is, whether there is a field of TCI state $ID_{0,3}$. Similarly, in a case that $C_{0,K}$ is 1, TCI state $ID_{0,K}$ represents an identification of a k-th TCI state in the group numbered 0. Similarly, in a group numbered N, TCI state $ID_{N,1}$ represents an identification of the 1st TCI state in the group numbered N. $C_{N,2}$ indicates whether there is a $2^{nd}$ TCI state in the group numbered N, that is, whether there is a field of TCI state $ID_{N,2}$. In a case that $C_{N,2}$ is 1, TCI state $ID_{N,2}$ represents an identification of the $2^{nd}$ TCI state in the group numbered N. $C_{N,3}$ indicates whether there is a $3^{rd}$ TCI state in the group numbered N, namely, whether there is a field of TCI state $ID_{N,3}$. Similarly, in a case that $C_{N,K}$ is 1, TCI state $ID_{N,K}$ represents an identification of the k-th TCI state in the group numbered N.

According to an embodiment of the present disclosure, the activation information may further include identification information of a serving cell of the user equipment, that is, multiple groups of TCI states are set for the serving cell, although TCI states in the multiple groups may come from different cells.

Figure 11:
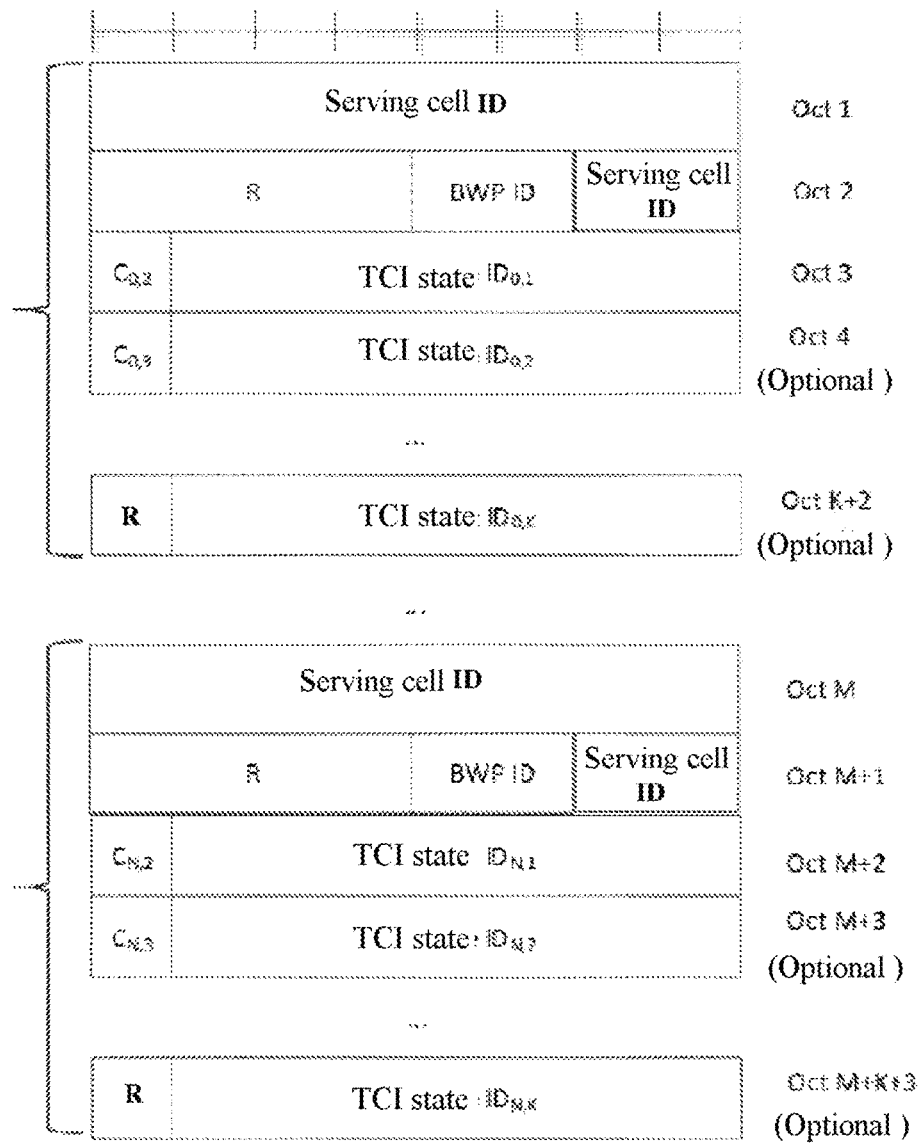
FIG. 11 is a schematic diagram showing activation of TCI states with respect to a PDSCH according to another embodiment of the present disclosure.

FIG. 11 is a schematic diagram showing activation of TCI states with respect to a PDSCH according to another embodiment of the present disclosure. FIG. 11 is similar to the example shown in FIG. 10, and same parts are not repeated here. A difference between FIG. 11 and FIG. 10 is that in the example shown in FIG. 11, a group of TCI states numbered 0 includes a serving cell ID, . . . and a group of TCI states numbered N also includes a serving cell ID.

As described above, through the activation information generated by the activation unit 220, the user equipment can activate multiple groups of TCI states, where each group of TCI states includes one or more TCI states.

Dynamic Indication of TCI States

According to an embodiment of the present disclosure, the indication unit 230 may determine which group of TCI states corresponds to transmitting beams to be used for transmitting a PDSCH, and generate indication information to indicate one group of TCI states of multiple groups of TCI states.

According to an embodiment of the present disclosure, the indication information may include group identification information of the indicated one group of TCI states. For example, in a case that the indication information includes a group identification of 0, user equipment may determine that a group numbered 0 is dynamically indicated by the electronic equipment 200. Thereby, the user equipment can determine TCI states included in the group numbered 0 dynamically indicated.

As described above, according to the embodiments of the present disclosure, with respect to a PDSCH, TCI states corresponding to transmitting beams from multiple cells may be configured, so that user equipment does not need to be configured with TCI states frequently. Further, the TCI states may be divided into multiple groups and multiple groups of TCI states may be activated. Indication information may be sent to the user equipment to indicate one group of TCI states, so that the user equipment can determine multiple transmitting beams corresponding to the TCI states included in the group of TCI states, and determine multiple receiving beams for receiving the PDSCH. Since the multiple transmitting beams transmit a same content, an accuracy of signal reception by the user equipment can be improved.

PDCCH

Configuration of TCI States

Configuration of TCI states according to the second embodiment of the present disclosure is the same as the configuration of TCI states according to the first embodiment of the present disclosure, and is not repeated here.

Activation of TCI States

According to the embodiment of the present disclosure, the electronic equipment 200 may divide multiple TCI states configured by the configuration unit 210 into multiple groups, where each group includes one or more TCI states, preferably multiple TCI states. The number of TCI states included in the groups may be the same or different.

Further, according to an embodiment of the present disclosure, the activation unit 220 may determine to activate, for each CORESET, one group of the multiple groups of TCI states configured by the configuration unit 210. Further, the activation unit 220 may generate activation information and send the activation information to the user equipment through the communication unit 240 to activate one group of TCI states. The group of TCI states include one or more TCI states.

According to an embodiment of the present disclosure, the activation information generated by the activation unit 220 may include identification information of respective TCI states in activated one group of TCI states.

According to an embodiment of the present disclosure, the activation information may further include identification information of a cell targeted by the group of TCI states, that is, one group of TCI states is set for the cell, although TCI states in the group may come from different cells.

Figure 12:
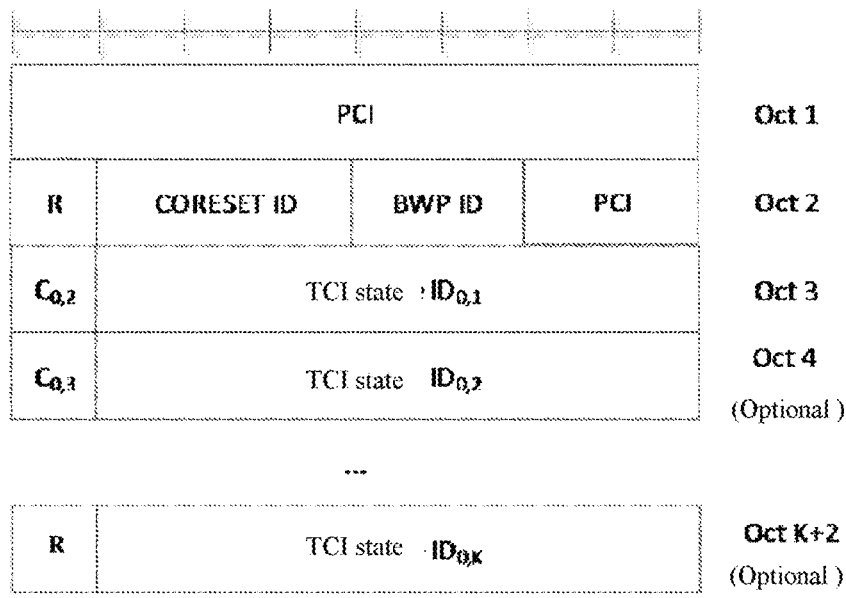
FIG. 12 is a schematic diagram showing activation of TCI states with respect to a PDCCH according to another embodiment of the present disclosure.

FIG. 12 is a schematic diagram showing activation of TCI states with respect to a PDCCH according to another embodiment of the present disclosure. In FIG. 12, PCI represents a physical cell identification of a cell to which a group of TCI states is targeted. That is, the group of TCI states is set for the cell having this PCI identification. TCI states in this group may come from different cells. R represents a reserved space. CORESET ID represents an identification of control resource set corresponding to the group of TCI states. BWP ID represents an identification of a BWP used by the cell having the PCI identification. TCI state $ID_{i,j}$ represents an identification of the j-th TCI state in a group numbered i. $C_{i,j}$ represents whether there is a j-th TCI state in a group numbered i. A value 0 of $C_{i,j}$ indicates that there is no j-th TCI state in a group numbered i; and a value 1 of $C_{i,j}$ indicates that there is a j-th TCI state in a group numbered i. i represents group identification information of an activated group of TCI states, and j represents a serial number of a TCI state in a group. j ranges from 1 to K, that is, each group includes up to K TCI states. Preferably, K may be 1, 2 or 4.

As shown in FIG. 12, a group numbered 0 is activated by the activation unit 220, and TCI state $ID_{0,1}$ represents an identification of a 1st TCI state in the group numbered 0. $C_{0,2}$ indicates whether there is a $2^{nd}$ TCI state in the group numbered 0, that is, whether there is a field of TCI state $ID_{0,2}$. In a case that $C_{0,2}$ is 1, TCI state $ID_{0,2}$ represents an identification of the $2^{nd}$ TCI state in the group numbered 0. $C_{0,3}$ indicates whether there is a $3^{rd}$ TCI state in the group numbered 0, that is, whether there is a field of TCI state $ID_{0,3}$. Similarly, in a case that $C_{0,K}$ is 1, TCI state $ID_{0,K}$ represents an identification of a k-th TCI state in the group numbered 0.

According to an embodiment of the present disclosure, the activation information may further include identification information of a serving cell of the user equipment, that is, one group of TCI states is configured for the serving cell, although TCI states in the group may come from different cells.

Figure 13:
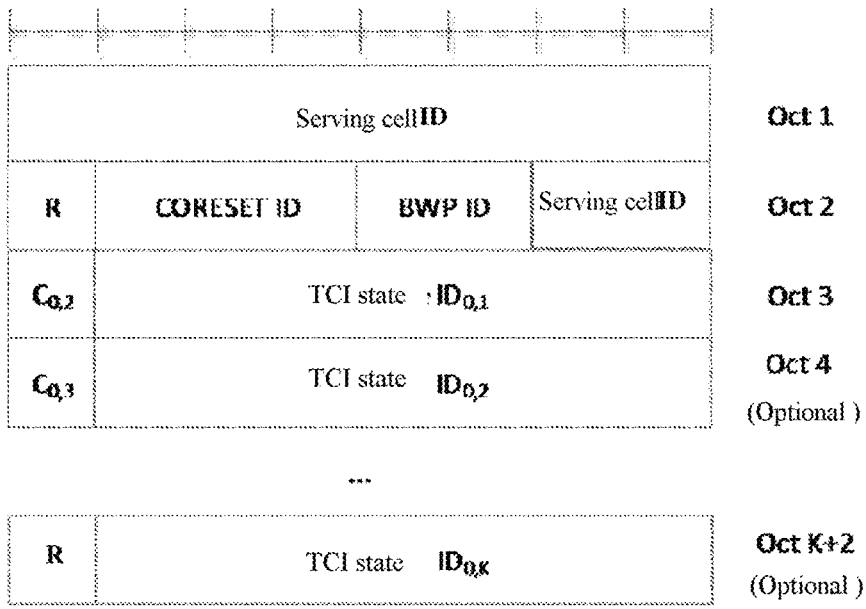
FIG. 13 is a schematic diagram showing activation of TCI states with respect to a PDCCH according to another embodiment of the present disclosure.

FIG. 13 is a schematic diagram showing activation of TCI states with respect to a PDCCH according to another embodiment of the present disclosure. FIG. 13 is similar to the example shown in FIG. 12, and same parts are not repeated here. a difference between FIG. 13 and FIG. 12 is that in the example shown in FIG. 13, the selected group of TCI status includes a serving cell ID instead of a PCI.

As described above, through the activation information generated by the activation unit 220, the user equipment can activate one group of TCI states. The group of TCI states include one or more TCI states, preferably multiple TCI states.

As described above, according to the embodiments of the present disclosure, with respect to a PDCCH, TCI states corresponding to transmitting beams from multiple cells may be configured, so that user equipment does not need to be configured with TCI states frequently. Further, the TCI states may be divided into multiple groups and one group of TCI states may be activated, so that the user equipment can determine multiple transmitting beams corresponding to the TCI states included in the group of TCI states and determine multiple receiving beams for receiving the PDCCH. Since the multiple transmitting beams transmit a same content, an accuracy of signal reception by the user equipment can be improved.

According to the embodiments of the present disclosure, the electronic equipment 200 can dynamically indicate multiple transmitting beams to be used for transmitting a PDSCH through the instruction information at one time, or activate multiple transmitting beams to be used for transmitting a PDCCH through the activation information at one time. Thereby, the user equipment can determine multiple receiving beams according to the multiple transmitting beams, and thereby realizing an SFN communication mode.

According to an embodiment of the present disclosure, the electronic equipment 200 can receive information of reception capacity of user equipment from the user equipment through the communication unit 240. Here, the information of reception capacity of the user equipment may include information of whether the user equipment can use multiple receiving beams simultaneously for receiving information. Alternatively, the information of reception capacity may further include a maximum number of receiving beams that the user equipment can use simultaneously. Hence, the electronic equipment 200 can determine the reception capability of the user equipment, and therefore determine a number of TCI states to be activated or dynamically indicated according to the reception capability of the user equipment.

In conclusion, according to the embodiments of the present disclosure, a process of configuration, activation and dynamic indication of TCI states can be optimized.

3. Configuration Example of User Equipment

Figure 14:
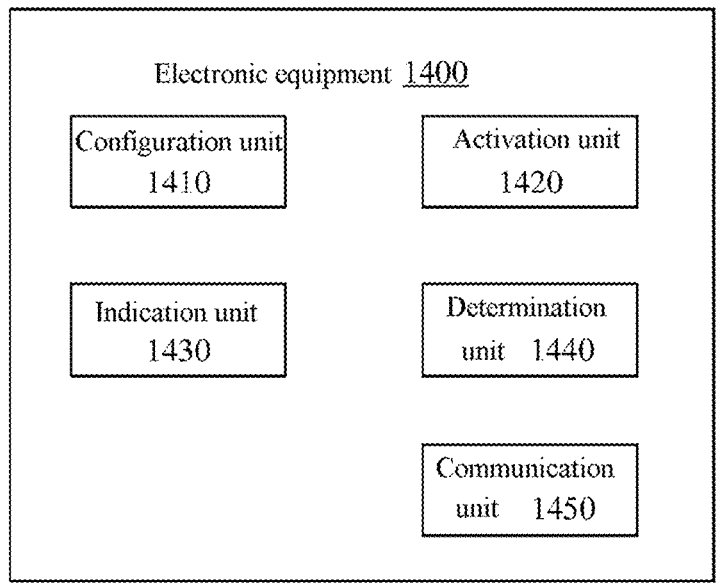
FIG. 14 is a block diagram showing an example of a configuration of electronic equipment serving as user equipment according to an embodiment of the present disclosure.

FIG. 14 is a block diagram showing a structure of electronic equipment 1400 serving as user equipment in a wireless communication system according to an embodiment of the present disclosure. As shown in FIG. 14, the electronic equipment 1400 may include a configuration unit 1410, an activation unit 1420, an indication unit 1430, a determination unit 1440, and a communication unit 1450.

Here, units of the electronic equipment 1400 can be included in processing circuitry. It should be noted that the electronic equipment 1400 may include a single processing circuit, or multiple processing circuits. Further, the processing circuitry may include various discrete functional units to perform various different functions and/or operations. It should be noted that these functional units may be physical entities or logical entities, and units with different names may be implemented by a same physical entity.

According to an embodiment of the present disclosure, the configuration unit 1410 may configure, based on a configuration of network side equipment, multiple TCI states which correspond to multiple transmitting beams. The multiple transmitting beams come from at least two cells.

According to an embodiment of the present disclosure, the electronic equipment 1400 may receive indication information from the network side equipment through the communication unit 1450.

According to an embodiment of the present disclosure, the indication unit 1430 may determine, based on the indication information, indicated two or more TCI states of the multiple TCI states configured by the configuration unit 1410.

According to an embodiment of the present disclosure, the determination unit 1440 may determine two or more transmitting beams according to the two or more TCI states determined by the indication unit 1430 respectively, and thereby determine two or more receiving beams.

Alternatively, according to an embodiment of the present disclosure, the electronic equipment 1400 may receive activation information from the network side equipment through the communication unit 1450.

According to an embodiment of the present disclosure, the activation unit 1420 may determine, based on the activation information, activated two or more TCI states of the multiple TCI states configured by the configuration unit 1410.

According to an embodiment of the present disclosure, the determination unit 1440 may determine two or more transmitting beams according to the two or more TCI states determined by the activation unit 1420 respectively, and thereby determine two or more receiving beams.

As described above, the electronic equipment 1400 of the present disclosure can configure TCI states of multiple cells, so that it is not necessary to be configured with TCI states frequently. Further, the indication information or activation information can indicate or activate multiple TCI states of the TCI states, so that multiple transmitting beams corresponding to the multiple TCI states can be determined, and multiple receiving beams can be determined. Since the electronic equipment 1400 can receive a same content by using multiple receiving beams, an accuracy of reception can be improved. In summary, according to the embodiments of the disclosure, a process of configuration, activation and dynamic indication of TCI states can be optimized.

With respect to a PDSCH (a downlink data signal), the user equipment may configure multiple TCI states, and determine, according to the indication information, dynamically indicated multiple TCI states of the multiple TCI states configured by the network side equipment. Alternatively, the user equipment may configure multiple TCI states, determine which TCI states of the multiple TCI states configured by the configuration unit 210 are activated according to the activation information from the network side equipment, and determine, according to the indication information, dynamically indicated multiple TCI states of the multiple TCI states activated by the activation unit 220. According to an embodiment of the present disclosure, the electronic equipment 1400 may receive configuration information for the PDSCH through RRC signaling, receive activation information for the PDSCH through MAC CE, and receive indication information for the PDSCH through DCI.

With respect to a PDCCH (downlink control signal), the user equipment may configure multiple TCI states, and determine, according to activation information, which TCI states of the multiple TCI states configured by the network side equipment are activated. According to an embodiment of the present disclosure, the electronic equipment 1400 may receive configuration information for the PDCCH through RRC signaling, and receive the activation information for the PDCCH through MAC CE.

First Embodiment

PDSCH
Configuration of TCI States

According to an embodiment of the present disclosure, the electronic equipment 1400 may receive configuration information from network side equipment, so that the configuration unit 1410 can configure TCI states associated with multiple transmitting beams from different cells. Here, the configuration information may include information of multiple TCI state. Information of each of the TCI states may include an identification of the TCI state, an identification of a reference signal targeted by the TCI state, and an identification of a cell of the transmitting beams corresponding to the TCI state.

Activation of TCI States

According to an embodiment of the present disclosure, the activation unit 1420 may receive activation information from network side equipment, and thereby determine, according to the activation information, activated multiple TCI states of multiple TCI states configured by the configuration unit 1410. For example, the electronic equipment 1400 may activate, according to the activation information, TCI states corresponding to transmitting beams of a cell that the electronic equipment 1400 is about to travel through.

Dynamic Indication of TCI States

According to an embodiment of the present disclosure, the indication information may include information for identifying a particular TCI state of multiple TCI states. Further, the indication unit 1430 may determine the particular TCI state and TCI states associated with the particular TCI state as indicated two or more TCI states.

According to an embodiment of the present disclosure, the TCI states associated with the particular TCI state may include a predetermined number of TCI states from the particular TCI state. That is, the TCI states associated with the particular TCI state may include a predetermined number of TCI states previous to the particular TCI state and a predetermined number of TCI states following the particular TCI state.

According to an embodiment of the present disclosure, the predetermined number may be 1. That is, the TCI states associated with the particular TCI state include TCI states adjacent to the particular TCI state, that is, a TCI state immediately previous to the particular TCI state and a TCI state immediately following the particular TCI state.

According to an embodiment of the present disclosure, after determining the particular TCI state according to the indication information, the indication unit 1430 may determine the TCI states associated with the particular TCI state according to the particular TCI state. For example, after the indication unit 1430 determines that the particular TCI state is TCI state 4, assuming that the predetermined number is 2, the indication unit 1430 may determine that the TCI states associated with the particular TCI state include TCI state 2, TCI state 3, TCI state 5, and TCI state 6, and thus determine TCI state 2 to TCI state 6 as the TCI states dynamically indicated by the network side equipment.

According to an embodiment of the present disclosure, the information for identifying a particular TCI state may include identification information of the particular TCI state. The indication unit 1430 may determine the particular TCI state according to the identification information of the particular TCI state.

According to an embodiment of the present disclosure, the information for identifying a particular TCI state may include a differential value between identification information of the particular TCI state which is included in the indication information this time and identification information of the particular TCI state which is included in the indication information last time. The indication unit 1430 may determine the identification information of the particular TCI state included in the indication information this time based on the differential value and the identification information of the particular TCI state included in the indication information last time. For example, the indication unit 1430 may determine the identification information of the particular TCI state included in the indication information this time by calculating a sum of the differential value and the identification information of the particular TCI state included in the indication information last time. In a case that the sum overflows a maximum number of configured TCI states, a cyclic shift is performed and a count starts from 0.

As described above, according to the embodiments of the present disclosure, the electronic equipment 1400 may configure TCI states of multiple cells, and therefore does not need to be configured with TCI states frequently. Further, the indication information may indicate multiple TCI states of the TCI states, and the determination unit 1440 may determine multiple transmitting beams corresponding to the indicated multiple TCI states, and thereby determine multiple receiving beams for receiving the PDSCH. Since the electronic equipment 1400 can receive a same content by using multiple receiving beams, an accuracy of reception can be improved.

PDCCH
Configuration of TCI States

According to an embodiment of the present disclosure, configuration of TCI states with respect to a PDCCH is the same as that with respect to the PDSCH, and is not described in detail here.

Activation of TCI States

According to an embodiment of the present disclosure, the activation information may include information for identifying a particular TCI state of multiple TCI states. Further, the activation unit 1420 may determine the particular TCI state and the TCI states associated with the particular TCI state as activated two or more TCI states.

According to an embodiment of the present disclosure, the TCI states associated with the particular TCI state may include a predetermined number of TCI states from the particular TCI state. That is, the TCI states associated with the particular TCI state may include a predetermined number of TCI states previous to the particular TCI state and a predetermined number of TCI states following the particular TCI state.

According to an embodiment of the present disclosure, the predetermined number may be 1. That is, the TCI states associated with the particular TCI state include TCI states adjacent to the particular TCI state, that is, a TCI state immediately previous to the particular TCI state and a TCI state immediately following the particular TCI state.

According to an embodiment of the present disclosure, after determining the particular TCI state according to the activation information, the activation unit 1420 may determine the TCI states associated with the particular TCI state according to the particular TCI state. For example, after the activation unit 1420 determines that the particular TCI state is TCI state 4, assuming that the predetermined number is 2, the activation unit 1420 may determine that the TCI states associated with the particular TCI state include TCI state 2, TCI state 3, TCI state 5, and TCI state 6, and thus determine TCI state 2 to TCI state 6 as the TCI states activated by the network side equipment.

According to an embodiment of the present disclosure, the information for identifying a particular TCI state may include identification information of the particular TCI state. The activation unit 1420 may determine the particular TCI state according to the activation information of the particular TCI state.

According to an embodiment of the present disclosure, the information for identifying a particular TCI state may include a differential value between identification information of the particular TCI state which is included in the activation information this time and identification information of the particular TCI state which is included in the activation information last time. The activation unit 1420 may determine the identification information of the particular TCI state included in the activation information this time based on the differential value and the identification information of the particular TCI state included in the activation information last time. For example, the activation unit 1420 may determine the identification information of the particular TCI state included in the activation information this time by calculating a sum of the differential value and the identification information of the particular TCI state included in the activation information last time. In a case that the sum overflows a maximum number of configured TCI states, a cyclic shift is performed and a count starts from 0.

As described above, according to the embodiments of the present disclosure, the electronic equipment 1400 may configure TCI states of multiple cells, and therefore does not need to be configured with TCI states frequently. Further, the activation unit 1420 may determine multiple activated TCI states of the TCI states. The determination unit 1440 may determine multiple transmitting beams corresponding to the activated multiple TCI states, and thereby determine multiple receiving beams for receiving the PDCCH. Since the electronic equipment 1400 can receive a same content by using the multiple receiving beams, an accuracy of reception can be improved.

Second Embodiment

PDSCH
Configuration of TCI States
Configuration of TCI states according to the second embodiment of the present disclosure is the same as the configuration of TCI states according to the first embodiment of the present disclosure, and is not repeated here.
Activation of TCI States
According to the embodiment of the present disclosure, the electronic equipment 1400 may receive activation information from network side equipment, so as to determine multiple groups of activated TCI states. Each group of TCI states includes one or more TCI states, preferably including multiple TCI states. The groups of TCI states may include a same number or different numbers of TCI states.

According to an embodiment of the present disclosure, the activation information includes group identification information of each group of TCI states of the multiple groups of TCI states and identification information of respective TCI states included in each group of TCI states.

According to an embodiment of the present disclosure, the activation information may further include identification information of a cell targeted by a group of TCI states, that is, the group of TCI states is set for the cell, although TCI states in the group may come from different cells.

According to an embodiment of the present disclosure, the activation information may further include identification information of a serving cell of the electronic equipment 1400, that is, multiple groups of TCI states are set for the serving cell, although TCI states in the multiple groups may come from different cells.

Dynamic Indication of TCI States
According to an embodiment of the present disclosure, the electronic equipment 1400 may receive indication information from network side device to determine indicated one group of TCI states.

According to an embodiment of the present disclosure, the instruction information may include group identification information of the indicated one group of TCI states.

As described above, according to the embodiments of the present disclosure, electronic equipment 1400 may configure TCI states of multiple cells, and therefore does not need to be configured with TCI states frequently. Further, the activation unit 1420 may determine activated multiple groups of TCI states. The indication unit 1430 may determine indicated one group of TCI states. The determination unit 1440 may determine multiple transmitting beams corresponding to TCI states included in the indicated one group of TCI states, and thereby determine multiple receiving beams for receiving the PDSCH. Since the electronic equipment 1400 can receive a same content by using the multiple receiving beams, an accuracy of reception can be improved.

PDCCH
Configuration of TCI States
Configuration of TCI states according to the second embodiment of the present disclosure is the same as the configuration of TCI states according to the first embodiment of the present disclosure, and is not repeated here.
Activation of TCI States
According to the embodiment of the present disclosure, the electronic equipment 1400 may receive activation information from network side equipment, to determine one group of TCI states activated for each CORESET. The group of TCI states includes one or more TCI states, preferably including multiple TCI states.

According to an embodiment of the present disclosure, the activation information includes identification information of respective TCI states included in the group of TCI states. In addition, the activation information may further include identification information of a CORESET targeted by the group of TCI states.

According to an embodiment of the present disclosure, the activation information may further include identification information of a cell targeted by the group of TCI states, that is, one group of TCI states is set for the cell, although TCI states in the group may come from different cells.

According to an embodiment of the present disclosure, the activation information may further include identification information of a serving cell of the electronic equipment 1400, that is, one group of TCI states is set for the serving cell, although TCI states in the group may come from different cells.

As described above, according to the embodiments of the present disclosure, the electronic equipment 1400 may configure TCI states of multiple cells, and therefore does not need to be configured with TCI states frequently. Further, the activation unit 1420 may determine activated one group of TCI states. The determination unit 1440 may determine multiple transmitting beams corresponding to multiple TCI states included in the activated one group of TCI states, and thereby determine multiple receiving beams for receiving a PDCCH. Since the electronic equipment 1400 can receive a same content by using the multiple receiving beams, an accuracy of reception can be improved.

According to an embodiment of the present disclosure, the electronic equipment 1400 may send information of reception capacity of the electronic equipment 1400 to network side equipment through the communication unit 1450. Here, the information of reception capacity of the electronic equipment 1400 may include information of whether the electronic equipment 1400 can use multiple receiving beams simultaneously for receiving information. Alternatively, the information of reception capacity may further include a maximum number of receiving beams that the electronic equipment 1400 can use simultaneously.

In conclusion, according to the embodiments of the present disclosure, a process of configuration, activation and dynamic indication of TCI states can be optimized.

The electronic equipment 200 according to the embodiments of the present disclosure may serve as network side equipment. The electronic equipment 1400 may serve as user equipment, that is, the electronic equipment 200 may serve the electronic equipment 1400. Therefore, all the embodiments of the electronic equipment 200 described before are applicable hereto.

<4. Method Embodiment

Next, a wireless communication method according to an embodiment of the present disclosure is described in detail. The method is performed by electronic equipment 200 serving as network side equipment in a wireless communication system.

Figure 15:
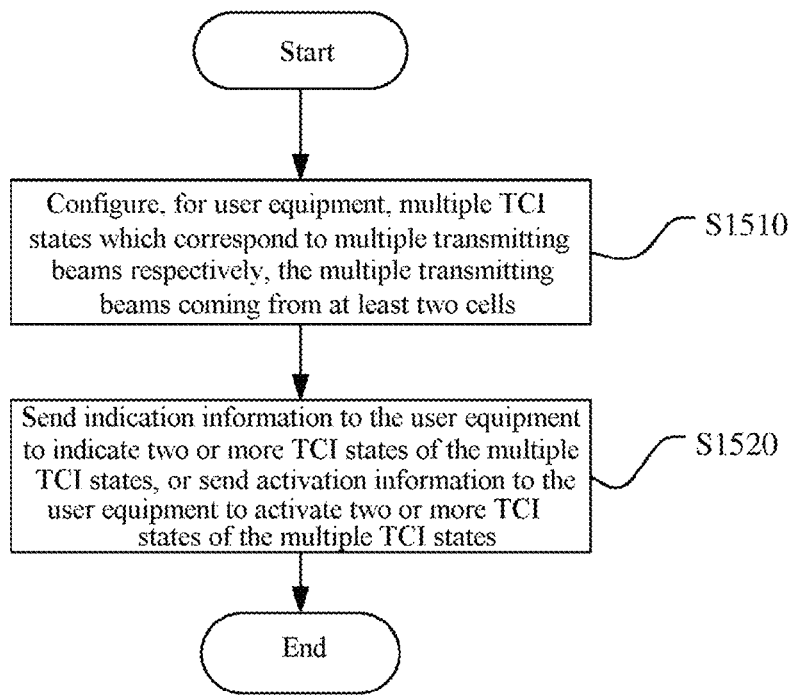
FIG. 15 is a flowchart showing a wireless communication method performed by electronic equipment serving as network side equipment according to an embodiment of the present disclosure.

FIG. 15 is a flowchart showing a wireless communication method performed by electronic equipment 200 serving as network side equipment in a wireless communication system according to an embodiment of the present disclosure.

As shown in FIG. 15, in step S1510, a plurality of TCI states which correspond to a plurality of transmitting beams respectively are configured for user equipment, where the plurality of transmitting beams come from at least two cells.

Next, in step S1520, indication information is sent to the user equipment to indicate two or more TCI states of the plurality of TCI states, or activation information is sent to the user equipment to activate two or more TCI states of the plurality of TCI states.

In a preferred embodiment, the wireless communication method further includes: with respect to a PDSCH, sending indication information to the user equipment and carrying the indication information by DCI; and with respect to a PDCCH, sending activation information to the user equipment and carrying the activation information by MAC CE.

In a preferred embodiment, the wireless communication method further includes: with respect to the PDSCH, sending activation information to the user equipment to activate multiple TCI states of the plurality of TCI states; and sending indication information to the user equipment to indicate two or more TCI states of the activated multiple TCI states.

In a preferred embodiment, the wireless communication method further includes: with respect to the PDSCH, carrying the activation information by MAC CE.

In a preferred embodiment, the indication information or activation information includes information for identifying a particular TCI state of the plurality of TCI states, and the indicated or activated two or more TCI states include the particular TCI state and TCI states associated with the particular TCI state.

In a preferred embodiment, the TCI states associated with the particular TCI state include TCI states adjacent to the particular TCI state.

In a preferred embodiment, the information for identifying the particular TCI state includes: identification information of the particular TCI state; or a differential value between identification information of the particular TCI state which is included in the indication information or activation information this time and identification information of the particular TCI state which is included in the indication information or activation information last time.

In a preferred embodiment, the wireless communication method further includes: with respect to the PDSCH, sending activation information to the user equipment to activate multiple groups of TCI states, each group of TCI states comprising a plurality of TCI states; and sending indication information to the user equipment to indicate one group of TCI states of the multiple groups of TCI states.

In a preferred embodiment, the activation information includes identification information of respective TCI states included in each group of TCI states of the multiple groups of TCI states, and the indication information includes group identification information of the indicated one group of TCI states.

In a preferred embodiment, the wireless communication method further includes: with respect to PDCCH, sending activation information to the user equipment to activate one group of TCI states, the group of TCI states including a plurality of TCI states, and the activation information including identification information of respective TCI states included in the group of TCI states.

According to and embodiment of the present disclosure, a subject of the method may be the electronic equipment 200 according to the embodiments of the present disclosure. Therefore, all the embodiments of the electronic equipment 200 described above are applicable here.

Next, a wireless communication method according to an embodiment of the present disclosure is described in detail. The method is performed by electronic equipment 1400 serving as user equipment in a wireless communication system.

Figure 16:
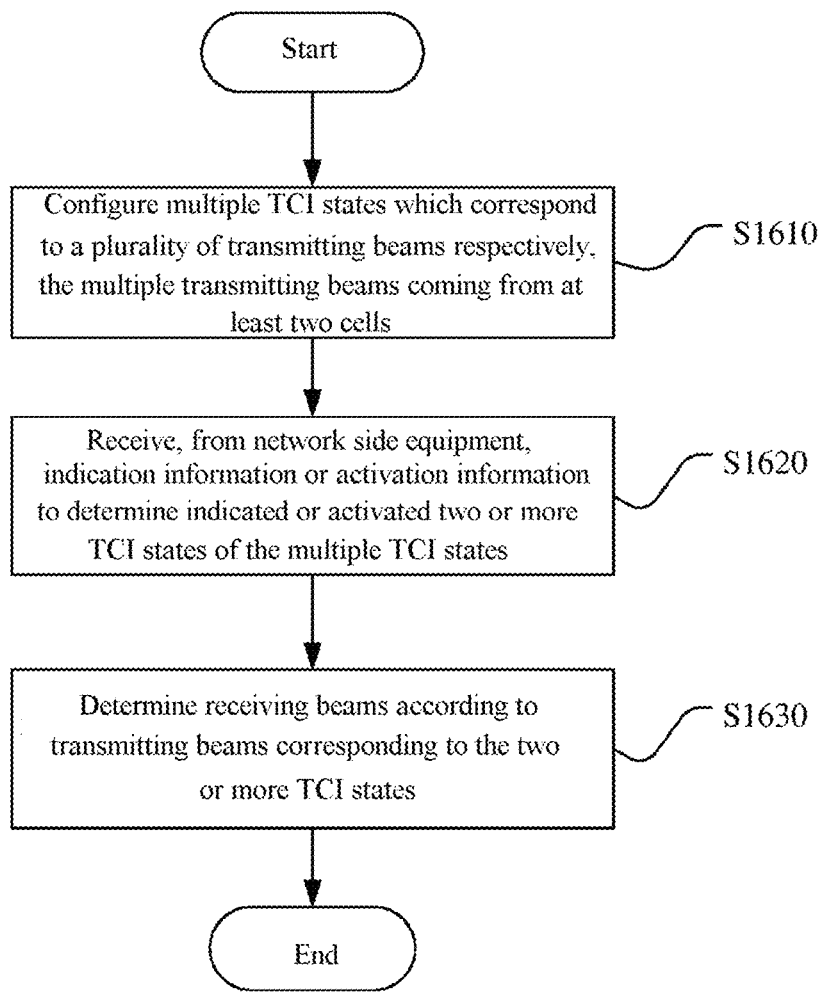
FIG. 16 is a flowchart showing a wireless communication method performed by electronic equipment serving as user equipment according to an embodiment of the present disclosure.

FIG. 16 is a flowchart showing a wireless communication method performed by electronic equipment 1400 serving as user equipment in a wireless communication system according to an embodiment of the present disclosure.

As shown in FIG. 16, in step S1610, a plurality of TCI states which correspond to a plurality of transmitting beams respectively are configured, where the plurality of transmitting beams come from at least two cells.

Next, in step S1620, indication information or activation information is received from network side equipment, to determine indicated or activated two or more TCI states of the plurality of TCI states.

Next, in step S1630, receiving beams are determined according to transmitting beams corresponding to two or more TCI states.

In a preferred embodiment, the wireless communication method further includes: with respect to a PDSCH, receiving the indication information from the network side equipment through DCI; and with respect to a PDCCH, receiving the activation information from the network side equipment through MAC CE.

In a preferred embodiment, the wireless communication method also includes: with respect to the PDSCH, receiving activation information from the network side equipment to determine activated multiple TCI states of the plurality of TCI states; and determining, based on the indication information, two or more TCI states of the activated multiple TCI states.

In a preferred embodiment, the wireless communication method further includes: with respect to the PDSCH, receiving the activation information through MAC CE.

In a preferred embodiment, the indication information or activation information includes information for identifying a particular TCI state of the plurality of TCI states, and the wireless communication method further includes: determining the particular TCI state and TCI states associated with the particular TCI state as the indicated or activated two or more TCI states.

In a preferred embodiment, the TCI states associated with the particular TCI state include TCI states adjacent to the particular TCI state.

In a preferred embodiment, the information for identifying the particular TCI state includes: identification information of the particular TCI state; or a differential value between identification information of the particular TCI state which is included in the indication information or activation information this time and identification information of the particular TCI state which is included in the indication information or activation information last time.

In a preferred embodiment, the wireless communication method further includes: with respect to the PDSCH, activating, according to the activation information, multiple groups of TCI states, each group of TCI states including a plurality of TCI states; and determining, according to the indication information, one group of TCI states of the multiple groups of TCI states as indicated TCI states.

In a preferred embodiment, the activation information includes identification information of respective TCI states included in each group of TCI states of the multiple groups of TCI states, and the indication information includes group identification information of the indicated one group of TCI states.

In a preferred embodiment, the wireless communication method further includes: with respect to a PDCCH, receiving activation information from the network side equipment to activate one group of TCI states, the group of TCI states including a plurality of TCI states, and the activation information including identification information of respective TCI states included in the group of TCI states.

According to an embodiment of the present disclosure, a subject of the method may be the electronic equipment 1400 according to the embodiments of the present disclosure. Therefore, all embodiments of the electronic equipment 1400 described above are applicable here.

5. Application Example

The technology of the present disclosure is applicable to various products.

The network side equipment may be implemented as base station equipment in any type, such as a macro eNB or a small eNB, and may be implemented as a gNB (a base station in a 5G system) in any type. The small eNB may be an eNB covering a cell smaller than a macro cell, such as a pico eNB, a micro eNB, or a home (femto) eNB. Alternatively, the base station may be implemented as any other type of base station, such as a NodeB or a base transceiver station (BTS). The base station may include a body (which is also referred to as base station equipment) configured to control wireless communication and one or more remote radio heads (RRHs) that are arranged in a different place from the body.

The user equipment may be implemented as a mobile terminal (such as a smartphone, a tablet personal computer (PC), a notebook PC, a portable game terminal, a portable/dongle-type mobile router, and a digital camera), or an in-vehicle terminal (such as a car navigation device). The user equipment may also be implemented as a terminal that performs machine-to-machine (M2M) communication (which is also referred to as a machine type communication (MTC) terminal). In addition, the user equipment may be a wireless communication module (such as an integrated circuit module including a single wafer) installed on each of the user equipment described above.

<Application Examples of a Base Station>

First Application Example

Figure 17:
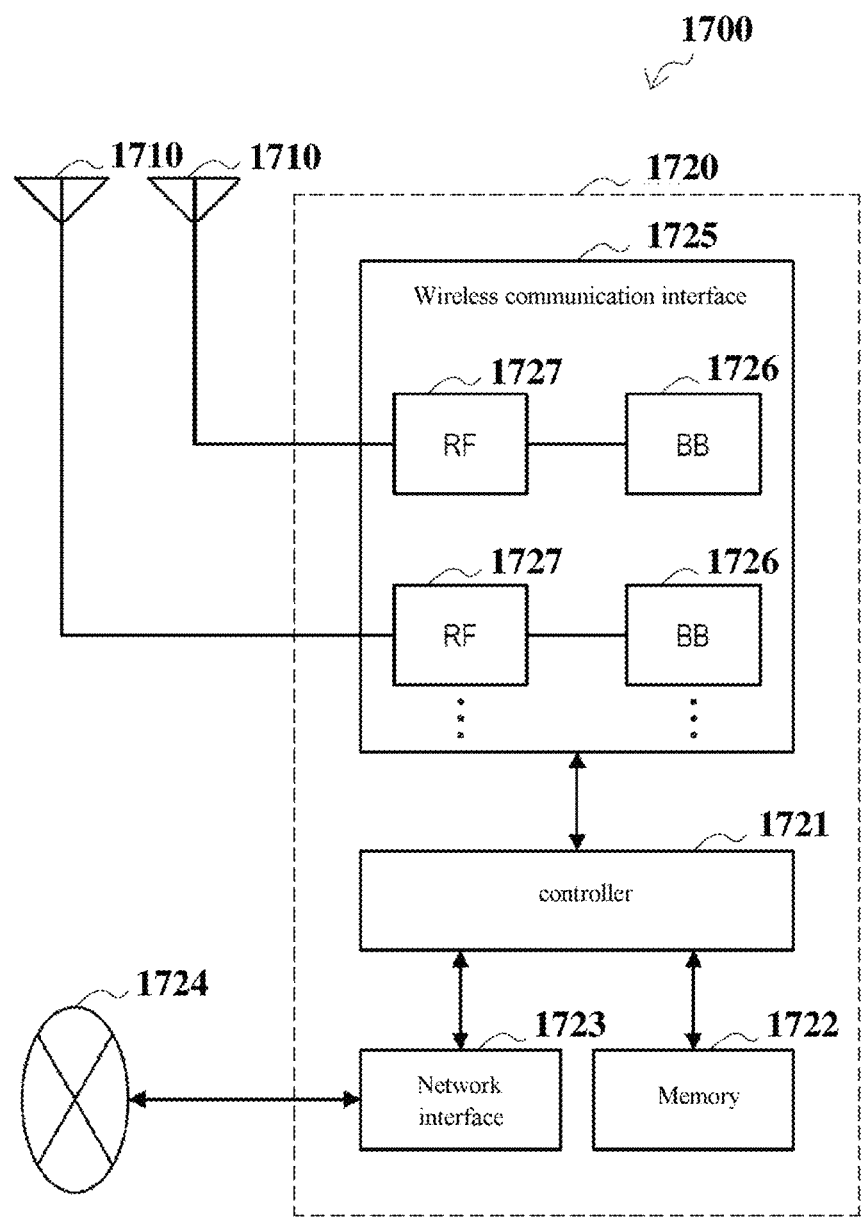
FIG. 17 is a block diagram showing a first example of a schematic configuration of an Evolved Node B (eNB)

FIG. 17 is a block diagram showing a first example of a schematic configuration of an eNB to which the technology of the present disclosure may be applied. The eNB 1700 includes a single or multiple antennas 1710 and base station equipment 1720. The base station equipment 1720 and each of the antennas 1710 may be connected to each other via a RF cable.

Each of the antennas 1710 includes a single or multiple antenna elements (such as multiple antenna elements included in a multiple-input multiple-output (MIMO) antenna), and are used for transmitting and receiving wireless signals by the base station equipment 1720. The eNB 1700 may include multiple antennas 1710, as shown in FIG. 17. For example, the multiple antennas 1710 may be compatible with multiple frequency bands used by the eNB 1700. Although FIG. 17 shows an example in which the eNB 1700 includes multiple antennas 1710, the eNB 1700 may include a single antenna 1710.

The base station equipment 1720 includes a controller 1721, a memory 1722, a network interface 1723, and a wireless communication interface 1725.

The controller 1721 may be, for example, a CPU or a DSP, and operates various high-level functions of the base station equipment 1720. For example, the controller 1721 generates a data packet according to data in a signal processed by the wireless communication interface 1725, and transfers the generated packet via the network interface 1723. The controller 1721 may bundle data from multiple baseband processors to generate a bundled packet, and transfer the generated bundled packet. The controller 1721 may have logical functions of performing control such as radio resource control, radio bearer control, mobility management, admission control, and scheduling. The control may be performed in conjunction with an adjacent eNB or a core network node. The memory 1722 includes a RAM and a ROM, and stores a program executed by the controller 1721, and various types of control data (such as a terminal list, transmission power data, and scheduling data).

The network interface 1723 is a communication interface for connecting the base station equipment 1720 to a core network 1724. The controller 1721 may communicate with a core network node or another eNB via the network interface 1723. In this case, the eNB 1700, and the core network node or the other eNB may be connected to each other through a logical interface (such as an Si interface and an X2 interface). The network interface 1723 may be a wired communication interface or a wireless communication interface for a wireless backhaul line. In a case that the network interface 1723 is a wireless communication interface, the network interface 1823 may use a higher frequency band for wireless communication than a frequency band used by the wireless communication interface 1725.

The wireless communication interface 1725 supports any cellular communication scheme (such as Long Term Evolution (LTE) and LTE-Advanced), and provides wireless connection to a terminal positioned in a cell of the eNB 1700 via the antenna 1710. The wireless communication interface 1725 may typically include, for example, a baseband (BB) processor 1726 and an RF circuit 1727. The BB processor 1726 may perform, for example, coding/decoding, modulation/demodulation and multiplexing/de-multiplexing, and perform various types of signal processes of layers (for example, L1, media access control (MAC), radio link control (RLC) and packet data convergence protocol (PDCP)). Instead of the controller 1721, the BB processor 1726 may have a part or all of the above logical functions. The BB processor 1726 may be a memory storing a communication control program, or a module including a processor and a related circuit configured to execute the program. Updating the program may change the functions of the BB processor 1726. The module may be a card or a blade inserted into a slot of the base station equipment 1720. Alternatively, the module may be a chip mounted on the card or the blade. In addition, the RF circuit 1727 may include, for example, a frequency mixer, a filter or an amplifier, and transmits and receives wireless signals via the antenna 1710.

As shown in FIG. 17, the wireless communication interface 1725 may include multiple BB processors 1726. For example, the multiple BB processors 1726 may be compatible with multiple frequency bands used by the eNB 1700. As shown in FIG. 17, the wireless communication interface 1725 may include multiple RF circuits 1727. For example, the multiple RF circuits 1727 may be compatible with multiple antenna elements. Although FIG. 17 shows an example in which the wireless communication interface 1725 includes multiple BB processors 1726 and multiple RF circuits 1727, the wireless communication interface 1725 may include a single BB processor 1726 or a single RF circuit 1727.

Second Application Example

Figure 18:
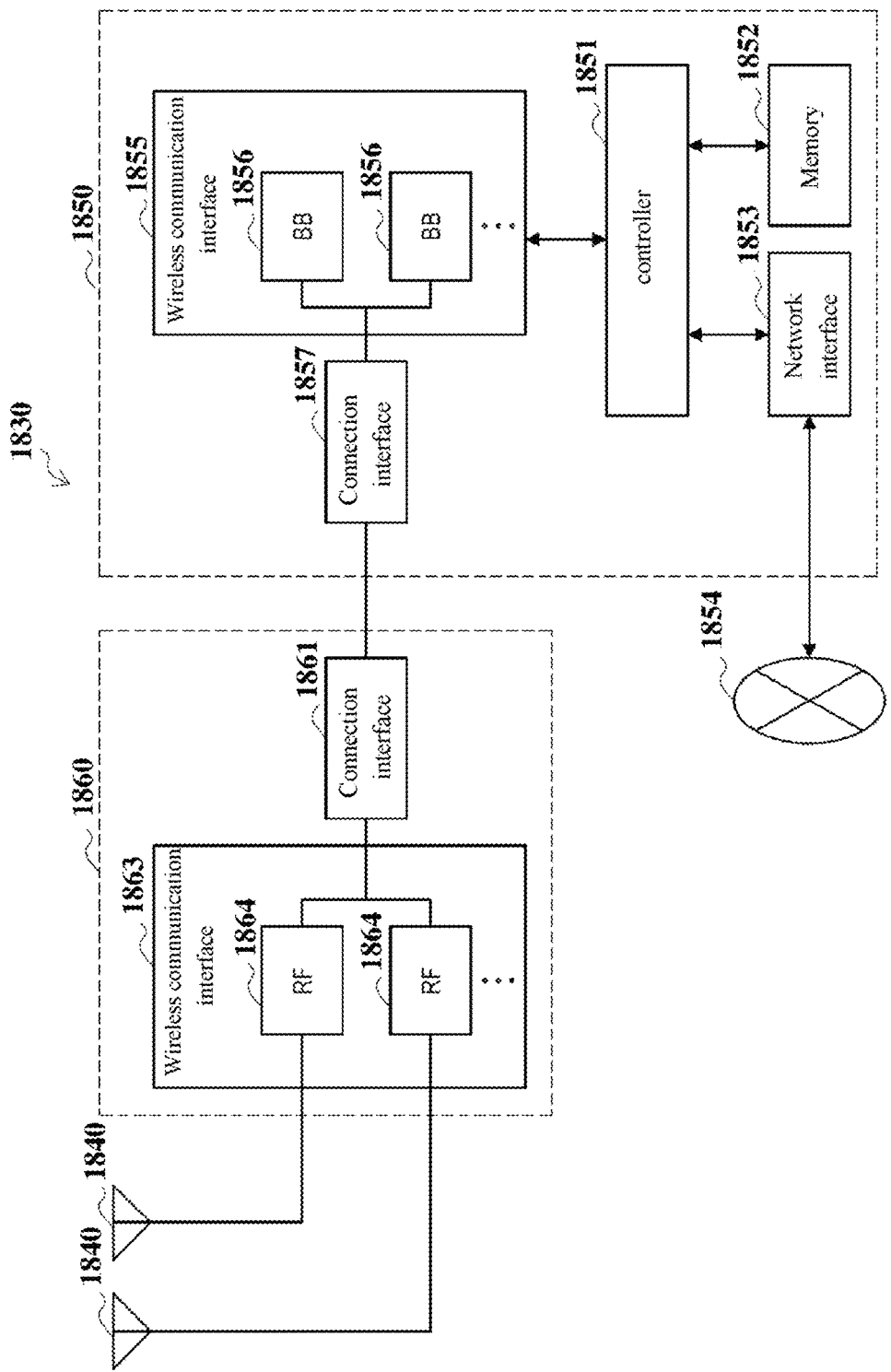
FIG. 18 is a block diagram showing a second example of a schematic configuration of an eNB.

FIG. 18 is a block diagram showing a second example of a schematic configuration of an eNB to which the technology of the present disclosure may be applied. An eNB 1830 includes a single or multiple antennas 1840, base station equipment 1850 and an RRH 1860. The RRH 1860 and the antennas 1840 may be connected to each other via an RF cable. The base station equipment 1850 and the RRH 1860 may be connected to each other via a high-speed line such as an optical fiber cable.

Each of the antennas 1840 includes a single or multiple antennal elements (such as multiple antenna elements included in a multiple-input multiple-output (MIMO) antenna), and is used for the RRH 1860 to transmit and receive wireless signals. As shown in FIG. 18, the eNB 1830 may include multiple antennas 1840. For example, the multiple antennas 1840 may be compatible with multiple frequency bands used by the eNB 1830. Although FIG. 18 shows an example in which the eNB 1830 includes multiple antennas 1840, the eNB 1830 may include a single antenna 1840.

The base station equipment 1850 includes a controller 1851, a memory 1852, a network interface 1853, a wireless communication interface 1855, and a connection interface 1857. The controller 1851, the memory 1852, and the network interface 1853 are the same as the controller 1721, the memory 1722, and the network interface 1723 described with reference to FIG. 17.

The wireless communication interface 1855 supports any cellular communication scheme (such as LTE and LTE-advanced), and provides wireless communication with a terminal located in a sector corresponding to the RRH 1860 via the RRH 1860 and the antenna 1840. The wireless communication interface 1855 may typically include, for example, a BB processor 1856. The BB processor 1856 is the same as the BB processor 1726 described with reference to FIG. 17, except that the BB processor 1856 is connected to an RF circuit 1864 of the RRH 1860 via the connection interface 1857. As show in FIG. 18, the wireless communication interface 1855 may include multiple BB processors 1856. For example, the multiple BB processors 1856 may be compatible with the multiple frequency bands used by the eNB 1830. Although FIG. 18 shows an example in which the wireless communication interface 1855 includes multiple BB processors 1856, the wireless communication interface 1855 may include a single BB processor 1856.

The connection interface 1857 is an interface for connecting the base station equipment 1850 (the wireless communication interface 1855) to the RRH 1860. The connection interface 1857 may be a communication module for communication in the above-described high speed line that connects the base station equipment 1850 (the wireless communication interface 1855) to the RRH 1860.

The RRH 1860 includes a connection interface 1861 and a wireless communication interface 1863.

The connection interface 1861 is an interface for connecting the RRH 1860 (the wireless communication interface 1863) to the base station equipment 1850. The connection interface 1861 may also be a communication module for communication in the above high-speed line.

The wireless communication interface 1863 transmits and receives wireless signals via the antenna 1840. The wireless communication interface 1863 may typically include, for example, the RF circuit 1864. The RF circuit 1864 may include, for example, a frequency mixer, a filter and an amplifier, and transmits and receives wireless signals via the antenna 1840. The wireless communication interface 1863 may include multiple RF circuits 1864, as shown in FIG. 18. For example, the multiple RF circuits 1864 may support multiple antenna elements. Although FIG. 18 shows the example in which the wireless communication interface 1863 includes multiple RF circuits 1864, the wireless communication interface 1863 may include a single RF circuit 1864.

In the eNB 1700 shown in FIG. 17 and the eNB 1830 shown in FIG. 18, the configuration unit 210, the activation unit 220, and the indication unit 230 described with reference to FIG. 2 may be implemented by the controller 1721 and/or the controller 1851. At least a part of the functions may be implemented by the controller 1721 and the controller 1851. For example, the controller 1721 and/or the controller 1851 may perform functions of configuring TCI states for user equipment, activating TCI states, and dynamically indicating TCI states by executing instructions stored on a corresponding memory.

<Application Examples of a Terminal Device>

First Application Example

Figure 19:
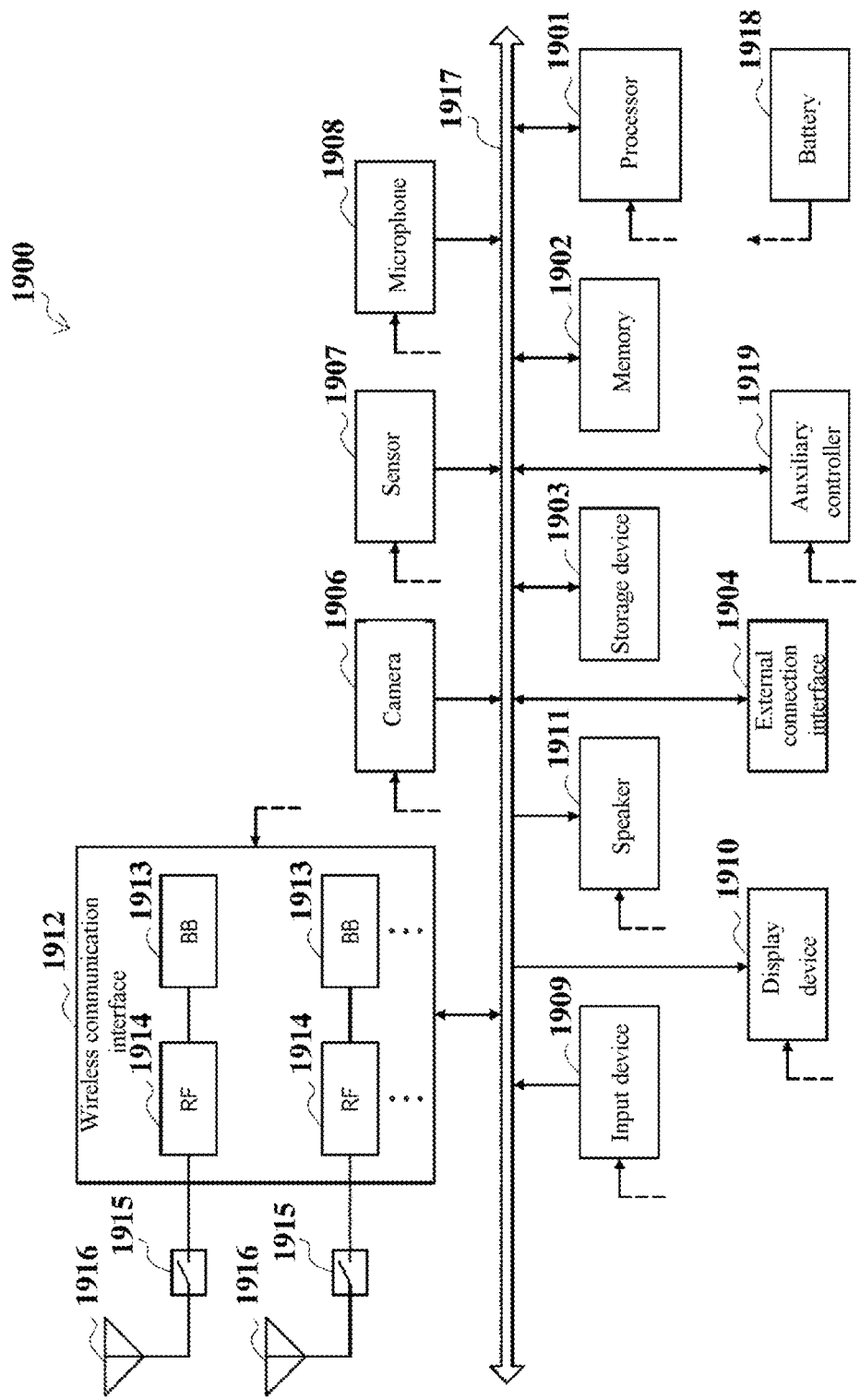
FIG. 19 is a block diagram showing an example of a schematic configuration of a smartphone.

FIG. 19 is a block diagram showing an example of a schematic configuration of a smartphone 1900 to which the technology according to the present disclosure may be applied. The smartphone 1900 includes a processor 1901, a memory 1902, a storage device 1903, an external connection interface 1904, a camera 1906, a sensor 1907, a microphone 1908, an input device 1909, a display device 1910, a speaker 1911, a wireless communication interface 1912, one or more antenna switches 1915, one or more antennas 1916, a bus 1917, a battery 1918, and an auxiliary controller 1919.

The processor 1901 may be, for example, a CPU or a system on a chip (SoC), and controls functions of an application layer and another layer of the smartphone 1900. The memory 1902 includes a RAM and a ROM, and stores a program executed by the processor 1901 and data. The storage 1903 may include a storage medium such as a semiconductor memory and a hard disk. The external connection interface 1904 is an interface for connecting an external device (such as a memory card and a universal serial bus (USB) device) to the smartphone 1900.

The camera 1906 includes an image sensor (such as a charge coupled device (CCD) and a complementary metal oxide semiconductor (CMOS)), and generates a captured image. The sensor 1907 may include a group of sensors, such as a measurement sensor, a gyro sensor, a geomagnetism sensor, and an acceleration sensor. The microphone 1908 converts sounds inputted to the smartphone 1900 to audio signals. The input device 1909 includes, for example, a touch sensor configured to detect touch onto a screen of the display device 1910, a keypad, a keyboard, a button, or a switch, and receives an operation or information inputted from a user. The display device 1910 includes a screen (such as a liquid crystal display (LCD) and an organic light-emitting diode (OLED) display), and displays an output image of the smartphone 1900. The speaker 1911 converts audio signals outputted from the smartphone 1900 to sounds.

The wireless communication interface 1912 supports any cellular communication scheme (such as LTE and LTE-advanced), and performs wireless communication. The wireless communication interface 1912 may include, for example, a BB processor 1913 and an RF circuit 1914. The BB processor 1913 may perform, for example, encoding/decoding, modulating/demodulating, and multiplexing/demultiplexing, and perform various types of signal processing for wireless communication. The RF circuit 1914 may include, for example, a mixer, a filter and an amplifier, and transmits and receives wireless signals via the antenna 2016. The wireless communication interface 1912 may be a chip module having the BB processor 1913 and the RF circuit 1914 integrated thereon. The wireless communication interface 1912 may include multiple BB processors 1913 and multiple RF circuits 1914, as shown in FIG. 19. Although FIG. 19 shows the example in which the wireless communication interface 1912 includes multiple BB processors 1913 and multiple RF circuits 1914, the wireless communication interface 1912 may include a single BB processor 1913 or a single RF circuit 1914.

Furthermore, in addition to a cellular communication scheme, the wireless communication interface 1912 may support another type of wireless communication scheme such as a short-distance wireless communication scheme, a near field communication scheme, and a wireless local area network (LAN) scheme. In this case, the wireless communication interface 1912 may include the BB processor 1913 and the RF circuit 1914 for each wireless communication scheme.

Each of the antenna switches 1915 switches connection destinations of the antennas 1916 among multiple circuits (such as circuits for different wireless communication schemes) included in the wireless communication interface 1912.

Each of the antennas 1916 includes a single or multiple antenna elements (such as multiple antenna elements included in an MIMO antenna) and is used for the wireless communication interface 1912 to transmit and receive wireless signals. The smartphone 1900 may include the multiple antennas 1916, as shown in FIG. 19. Although FIG. 19 shows the example in which the smartphone 1900 includes multiple antennas 1916, the smartphone 1900 may include a single antenna 1916.

Furthermore, the smartphone 1900 may include the antenna 1916 for each wireless communication scheme. In this case, the antenna switches 1915 may be omitted from the configuration of the smartphone 1900.

The bus 1917 connects the processor 1901, the memory 1902, the storage device 1903, the external connection interface 1904, the camera 1906, the sensor 1907, the microphone 1908, the input device 1909, the display device 1910, the speaker 1911, the wireless communication interface 1912, and the auxiliary controller 1919 to each other. The battery 1918 supplies power to blocks of the smartphone 1900 shown in FIG. 19 via feeder lines, which are partially shown as dashed lines in FIG. 19. The auxiliary controller 1919 operates a minimum necessary function of the smartphone 1900, for example, in a sleep mode.

In the smartphone 1900 shown in FIG. 19, the configuration unit 1410, the activation unit 1420, the indication unit 1430, and the determination unit 1440 described with reference to FIG. 14 may be implemented by the processor 1901 or the auxiliary controller 1919. At least a part of the functions may be implemented by the processor 1901 or the auxiliary controller 1919. For example, the processor 1901 or the auxiliary controller 1919 may perform the functions of configuring TCI states according configuration on a network side, determining activated TCI states according to the configuration on the network side, dynamically indicating TCI states according to the configuration on the network side, and determining receiving beams, by executing instructions stored on the memory 1902 or the storage device 1903.

Second Application Example

Figure 20:
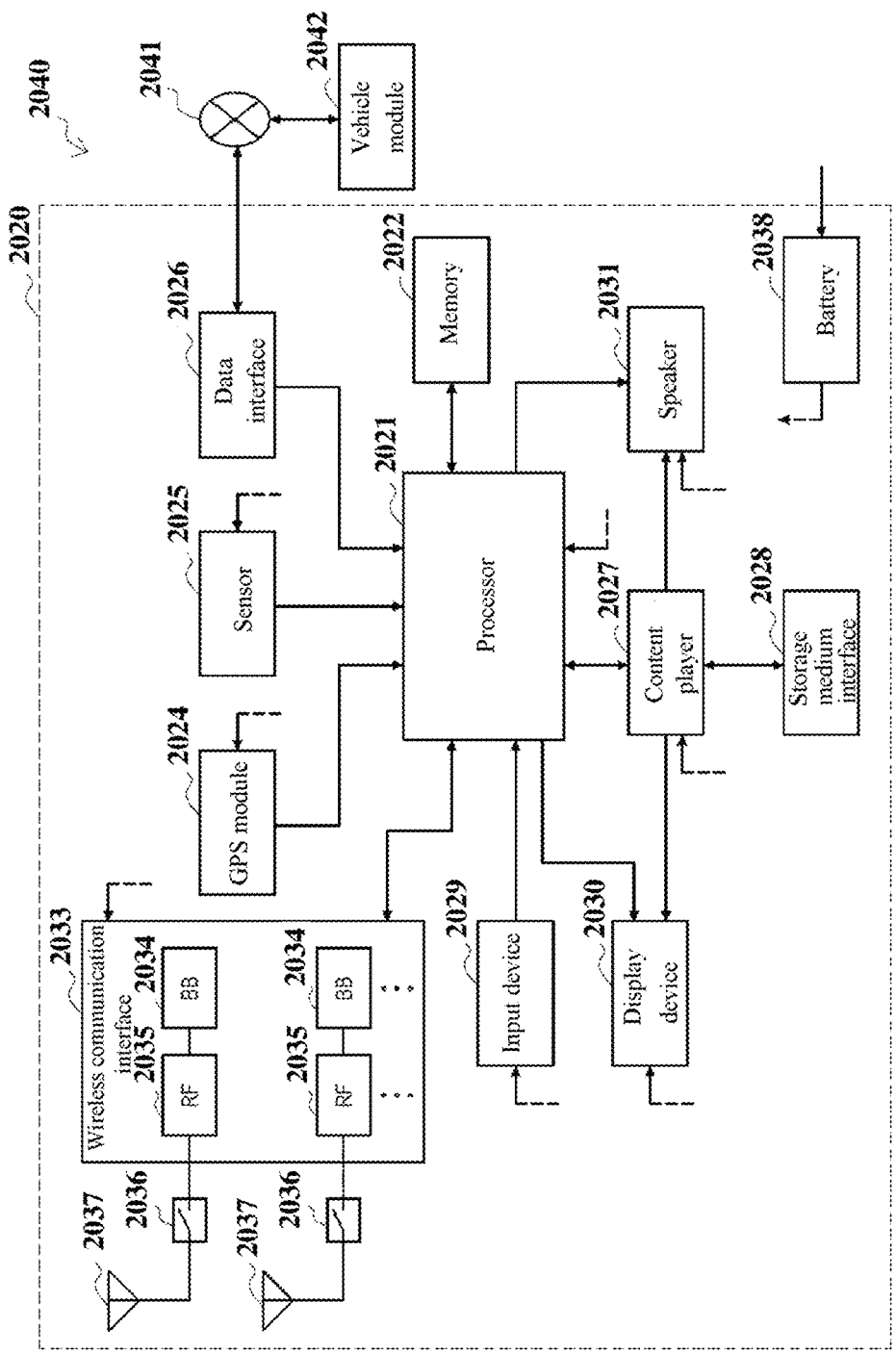
FIG. 20 is a block diagram showing an example of a schematic configuration of a car navigation device.

FIG. 20 is a block diagram showing an example of a schematic configuration of a navigation apparatus 2020 to which the technology according to the present disclosure may be applied. The navigation apparatus 2020 includes a processor 2021, a memory 2022, a global positioning system (GPS) module 2024, a sensor 2025, a data interface 2026, a content player 2027, a storage medium interface 2028, an input device 2029, a display device 2030, a speaker 2031, a wireless communication interface 2033, one or more antenna switches 2036, one or more antennas 2037, and a battery 2038.

The processor 2021 may be, for example a CPU or a SoC, and controls a navigation function and additional function of the navigation apparatus 2020. The memory 2022 includes RAM and ROM, and stores a program executed by the processor 2021, and data.

The GPS module 2024 determines a position (such as latitude, longitude and altitude) of the navigation apparatus 2020 by using GPS signals received from a GPS satellite. The sensor 2025 may include a group of sensors such as a gyro sensor, a geomagnetic sensor and an air pressure sensor. The data interface 2026 is connected to, for example, an in-vehicle network 2041 via a terminal that is not shown, and acquires data (such as vehicle speed data) generated by the vehicle.

The content player 2027 reproduces content stored in a storage medium (such as a CD and DVD) that is inserted into the storage medium interface 2028. The input device 2029 includes, for example, a touch sensor configured to detect touch on a screen of the display device 2030, a button, or a switch, and receives an operation or information inputted from a user. The display device 2030 includes a screen such as an LCD or OLED display, and displays an image of the navigation function or reproduced content. The speaker 2031 outputs a sound for the navigation function or the reproduced content.

The wireless communication interface 2033 supports any cellular communication scheme (such as LTE and LTE-Advanced), and performs wireless communication. The wireless communication interface 2033 may typically include, for example, a BB processor 2034 and an RF circuit 2035. The BB processor 2034 may perform, for example, encoding/decoding, modulating/demodulating and multiplexing/demultiplexing, and perform various types of signal processing for wireless communication. The RF circuit 2035 may include, for example, a mixer, a filter and an amplifier, and transmits and receives wireless signals via the antenna 2037. The wireless communication interface 2033 may also be a chip module having the BB processor 2034 and the RF circuit 2035 integrated thereon. As shown in FIG. 20, the wireless communication interface 2033 may include multiple BB processors 2034 and multiple RF circuits 2035. Although FIG. 20 shows the example in which the wireless communication interface 2033 includes multiple BB processors 2034 and multiple RF circuits 2035, the wireless communication interface 2033 may include a single BB processor 2034 and a single RF circuit 2035.

Furthermore, in addition to a cellular communication scheme, the wireless communication interface 2033 may support another type of wireless communication scheme such as a short-distance wireless communication scheme, a near field communication scheme, and a wireless LAN scheme. In this case, the wireless communication interface 2033 may include the BB processor 2034 and the RF circuit 2035 for each wireless communication scheme.

Each of the antenna switches 2036 switches connection destinations of the antennas 2037 among multiple circuits (such as circuits for different wireless communication schemes) included in the wireless communication interface 2033.

Each of the antennas 2037 includes a single or multiple antenna elements (such as multiple antenna elements included in an MIMO antenna), and is used for the wireless communication interface 2033 to transmit and receive wireless signals. As shown in FIG. 20, the car navigation apparatus 2020 may include multiple antennas 2037. Although FIG. 20 shows the example in which the car navigation apparatus 2020 includes multiple antennas 2037, the car navigation apparatus 2020 may include a single antenna 2037.

Furthermore, the car navigation apparatus 2020 may include the antenna 2037 for each wireless communication scheme. In this case, the antenna switches 2036 may be omitted from the configuration of the navigation apparatus 2020.

The battery 2038 supplies power to the blocks of the car navigation apparatus 2020 shown in FIG. 20 via feeder lines that are partially shown as dash lines in FIG. 20. The battery 2038 accumulates power supplied from the vehicle.

In the car navigation apparatus 2020 shown in FIG. 20, the configuration unit 1410, the activation unit 1420, the indication unit 1430, and the determination unit 1440 described with reference to FIG. 14 may be implemented by the processor 2021. At least a part of the functions may be implemented by the processor 2021. For example, the processor 2021 may perform the functions of configuring TCI states according configuration on a network side, determining activated TCI states according to the configuration on the network side, dynamically indicating TCI states according to the configuration on the network side, and determining receiving beams, by executing instructions stored on the memory 2022.

The technical solution of the present disclosure may be implemented as an in-vehicle system (or vehicle) 2040 including the car navigation apparatus 2020, the in-vehicle network 2041, and one or more blocks of a vehicle module 2042. The vehicle module 2042 generates vehicle data such as vehicle speed, engine speed, and fault information, and outputs the generated data to the in-vehicle network 2041.

The preferred embodiments of the present disclosure are described above with reference to the drawings, but the present disclosure is not limited to the above examples. Various alternations and modifications may be obtained by those skilled in the art within the scope of the claims, and it should be understood that these alternations and modifications shall naturally fall within the technical scope of the present disclosure.

For example, a unit shown by a dashed box in the functional block diagram shown in the drawings indicates that the functional unit is optional in the corresponding device, and the optional functional units may be combined in an appropriate manner to achieve a desired function.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. Apparently, such configurations are within the technical scope of the present disclosure.

In this specification, the steps described in the flowchart include not only processes performed in time series as the order described, but also processes performed in parallel or individually instead of having to be performed in time series. Further, even in the steps processed in time series, the order can be appropriately changed.

Although the embodiments of the present disclosure have been described above in detail in connection with the drawings, it is appreciated that the embodiments described above are merely illustrative rather than limitative for the present disclosure. Those skilled in the art can make various modifications and variations to the above embodiments without departing from the spirit and scope of the present disclosure. Therefore, the scope of the present disclosure is defined merely by the appended claims and equivalents thereof.

The invention claimed is:

1. A wireless communication device configured to operate as a base station, comprising:
processing circuitry configured to:
predict a travel route of a user equipment;
determine a plurality of cells of the base station that the user equipment will pass along the predicted travel route;
configure, for the user equipment, a plurality of transmission configuration indication (TCI) states, each of the plurality of TCI states corresponding to a respective one of a plurality of transmitting beams along the predicted travel route of the user equipment;
upon the determining that the user equipment is about to enter a predetermined portion of the predicted travel route, send activation information to the user equipment to activate multiple TCI states of the plurality of TCI states, the activated multiple TCI states being a subset of the plurality of TCI states, the subset of the plurality of TCI states corresponding to the predetermined portion of the predicted travel route; and
with respect to a Physical Downlink Shared CHannel (PDSCH), send Downlink Control Information (DCI) to the user equipment, the DCI comprising indication information that indicates two or more TCI states of the activated multiple TCI states,
wherein two of the two or more TCI states are associated with different cells of the plurality of cells of the base station that are adjacent to each other along the predicted travel route of the user equipment.

2. The wireless communication device according to claim 1, wherein the processing circuitry is further configured to:
send the activation information by a Medium Access Control Layer Control Element (MAC CE).

3. The wireless communication device according to claim 1, wherein the indication information or activation information includes information for identifying a particular TCI state of the plurality of TCI states, and the indicated or activated two or more TCI states include the particular TCI state and TCI states associated with the particular TCI state.

4. The wireless communication device according to claim 3, wherein the TCI states associated with the particular TCI state include TCI states adjacent to the particular TCI state.

5. The wireless communication device according to claim 3, wherein the information for identifying the particular TCI state comprises:
identification information of the particular TCI state.

6. The wireless communication device according to claim 3, wherein the information for identifying the particular TCI state comprises:
a differential value between:
identification information of a particular TCI state which is included in the indication information or activation information for a current time, and
identification information of a particular TCI state which is included in the indication information or activation information for a time previous to and adjacent to the current time.

7. The wireless communication device according to claim 1,
wherein the activation information to activate multiple TCI states of the plurality of TCI states includes activation information to activate multiple groups of TCI states, each group of TCI states comprising a plurality of TCI states; and
wherein the indication information that indicates two or more TCI states of the activated multiple TCI states includes indication information that indicates one group of TCI states of the multiple groups of TCI states.

8. The wireless communication device according to claim 7,
wherein the activation information to activate the multiple groups of TCI states includes identification information of respective TCI states included in each group of TCI states of the multiple groups of TCI states, and
wherein the indication information that indicates one group of TCI states of the multiple groups of TCI states includes group identification information of the indicated one group of TCI states.

9. The wireless communication device according to claim 1,
wherein the activation information to activate the multiple TCI states of the plurality of TCI states includes activation information to activate one group of TCI states, the one group of TCI states including a plurality of TCI states, and
wherein the activation information includes identification information of respective TCI states included in the one group of TCI states.

10. A wireless communication device configured to operate as a user equipment, comprising:
processing circuitry configured to:
receive information from network side equipment,
based on the information received from the network side equipment, configure a plurality of transmission configuration indication (TCI) states, each of the plurality of TCI states corresponding to a respective one of a plurality of transmitting beams along a travel route of the user equipment that is predicted by the network side equipment;
based on the network side equipment determining that the user equipment is about to enter a predetermined portion of the predicted travel route that is predicted by the network side equipment, receive, from the network side equipment, activation information to determine activated multiple TCI states of the plurality of TCI states, the activated multiple TCI states being a subset of the plurality of TCI states, the subset of the plurality of TCI states corresponding to the predetermined portion of the predicted travel route that is predicted by the network side equipment;
with respect to a Physical Downlink Shared CHannel (PDSCH), receive, from network side equipment, Downlink Control Information (DCI) to the user equipment, the DCI comprising indication information that indicates two or more TCI states from the activated TCI states; and
determine receiving beams according to transmitting beams corresponding to the two or more TCI states,
wherein two of the two or more TCI states are associated with different cells of a plurality of cells of the network side equipment that the network side device predicted that the user equipment will pass along the predicted travel route, the different cells being adjacent to each other along the predicted travel route of the user equipment.

11. The wireless communication device according to claim 10,
wherein the activation information is received through a Medium Access Control Layer Control Element (MAC CE).

12. The wireless communication device according to claim 10, wherein
the indication information or activation information includes information for identifying a particular TCI state of the plurality of TCI states, and
the processing circuitry is further configured to determine the particular TCI state and TCI states associated with the particular TCI state as the indicated or activated two or more TCI states.

13. The wireless communication device according to claim 12, wherein the TCI states associated with the particular TCI state include TCI states adjacent to the particular TCI state.

14. The wireless communication device according to claim 12, wherein the information for identifying the particular TCI state comprises:
identification information of the particular TCI state.

15. The wireless communication device according to claim 12, wherein the information for identifying the particular TCI state comprises:
a differential value between:
identification information of a particular TCI state which is included in the indication information or activation information for a current time, and
identification information of a particular TCI state which is included in the indication information or activation information for a time previous to and adjacent to the current time.

16. The wireless communication device according to claim 10,
wherein the activation information to activate multiple TCI states of the plurality of TCI states includes activation information to activate multiple groups of TCI states, each group of TCI states comprising a plurality of TCI states; and
wherein the indication information that indicates two or more TCI states of the activated multiple TCI states includes indication information that indicates one group of TCI states of the multiple groups of TCI states.

17. The wireless communication device according to claim 16,
wherein the activation information to activate the multiple groups of TCI states includes identification information of respective TCI states included in each group of TCI states of the multiple groups of TCI states, and
wherein the indication information that indicates one group of TCI states of the multiple groups of TCI states includes group identification information of the indicated one group of TCI states.

18. The wireless communication device according to claim 10,
wherein the activation information to activate the multiple TCI states of the plurality of TCI states includes activation information to activate one group of TCI states, the one group of TCI states including a plurality of TCI states, and
wherein the activation information includes identification information of respective TCI states included in the one group of TCI states.

19. A method for wireless communication performed by a base station, the method comprising:
predicting a travel route of a user equipment:
determining a plurality of cells of the base station that the user equipment will pass along the predicted travel route;
configuring, for the user equipment, a plurality of transmission configuration indication (TCI) states, each of the plurality of TCI states corresponding to a respective one of a plurality of transmitting beams along the predicted travel route of the user equipment;
upon the determining that the user equipment is about to enter a predetermined portion of the predicted travel route, sending activation information to the user equipment to activate multiple TCI states of the plurality of TCI states, the activated multiple TCI states being a subset of the plurality of TCI states the subset of the plurality of TCI states corresponding to the predetermined portion of the predicted travel route; and
with respect to a Physical Downlink Shared CHannel (PDSCH), sending Downlink Control Information (DCI) to the user equipment, the DCI comprising indication information that indicates two or more TCI states of the activated multiple TCI states,
wherein two of the two or more TCI states are associated with different cells of the plurality of cells of the base station that are adjacent to each other along the predicted travel route of the user equipment.

20. A method for wireless communication performed by a user equipment, comprising:
receiving information from network side equipment;
based on the information received from the network side equipment, configuring a plurality of transmission configuration indication (TCI) states, each of the plurality of TCI states corresponding to a respective one of a plurality of transmitting beams along a travel route of the user equipment that is predicted by the network side equipment;
based on the network side equipment determining that the user equipment is about to enter a predetermined portion of the predicted travel route that is predicted by the network side equipment, receiving, from the network side equipment, activation information to determine activated multiple TCI states of the plurality of TCI states, the activated multiple TCI states being a subset of the plurality of TCI states, the subset of the plurality of TCI states corresponding to the predetermined portion of the predicted travel route that is predicted by the network side equipment;
with respect to a Physical Downlink Shared CHannel (PDSCH), receiving, from network side equipment, Downlink Control Information (DCI) to the user equipment, the DCI comprising indication information that indicates two or more TCI states from the activated TCI states; and
determining receiving beams according to transmitting beams corresponding to the two or more TCI states,
wherein two of the two or more TCI states are associated with different cells of a plurality of cells of the network side equipment that the network side device predicted that the user equipment will pass along the predicted travel route, the different cells being adjacent to each other along the predicted travel route of the user equipment.

* * * * *